(12) United States Patent
Miyata et al.

(10) Patent No.: US 9,140,942 B2
(45) Date of Patent: Sep. 22, 2015

(54) LIQUID CRYSTAL DISPLAY DEVICE AND MULTI-DISPLAY SYSTEM

(75) Inventors: Hidekazu Miyata, Osaka (JP); Tamotsu Sakai, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 156 days.

(21) Appl. No.: 14/111,040

(22) PCT Filed: Apr. 9, 2012

(86) PCT No.: PCT/JP2012/059679
§ 371 (c)(1),
(2), (4) Date: Oct. 10, 2013

(87) PCT Pub. No.: WO2012/141133
PCT Pub. Date: Oct. 18, 2012

(65) Prior Publication Data
US 2014/0036187 A1 Feb. 6, 2014

(30) Foreign Application Priority Data

Apr. 12, 2011 (JP) .................. 2011-088552

(51) Int. Cl.
*G09G 3/36* (2006.01)
*G02F 1/1343* (2006.01)

(52) U.S. Cl.
CPC ........ *G02F 1/134363* (2013.01); *G09G 3/3614* (2013.01); *G09G 3/3659* (2013.01);
(Continued)

(58) Field of Classification Search
CPC ............... G09G 3/3659; G09G 2300/0852; G09G 2300/0876; G09G 2300/0842; G09G 2310/0251; G02F 1/13624; G02F 1/136213
USPC .............. 345/87, 92, 98; 349/38, 39
See application file for complete search history.

(56) References Cited

U.S. PATENT DOCUMENTS 6,181,311 B1   1/2001 Hashimoto
6,496,170 B1  12/2002 Yoshida et al.
(Continued)

FOREIGN PATENT DOCUMENTS

JP  H8-146458 A   6/1996
JP  H09-114421 A  5/1997
(Continued)

OTHER PUBLICATIONS

International Preliminary Report on Patentability dated Oct. 24, 2013.
(Continued)

*Primary Examiner* — Koosha Sharifi-Tafreshi
(74) *Attorney, Agent, or Firm* — Harness, Dickey & Pierce, P.L.C.

(57) ABSTRACT

A liquid crystal display device includes a first scanning line, a second scanning line and a third scanning line which are provided for each of a plurality of pixel rows; a first signal line and a second signal line which are provided for each of a plurality of pixel columns; a pixel capacitor provided for each of a plurality of pixels; a temporary storage capacitor for temporarily storing a voltage to be written to the pixel capacitor; a first switching element for controlling electrical connection between the first signal line and the temporary storage capacitor; a second switching element for controlling electrical connection between the temporary storage capacitor and the pixel capacitor; and a third switching element for controlling electrical connection between the second signal line and the pixel capacitor.

16 Claims, 19 Drawing Sheets

(52) U.S. Cl.
CPC ............ *G09G3/3688* (2013.01); *G09G 3/3655* (2013.01); *G09G 3/3677* (2013.01); *G09G 2300/0814* (2013.01); *G09G 2300/0876* (2013.01); *G09G 2310/0202* (2013.01); *G09G 2310/063* (2013.01); *G09G 2310/067* (2013.01); *G09G 2310/08* (2013.01)

(56) References Cited

U.S. PATENT DOCUMENTS

| | | | |
|---|---|---|---|
| 6,600,472 | B1 | 7/2003 | Nakai et al. |
| 2010/0265222 | A1 | 10/2010 | Tsuboi et al. |
| 2011/0096051 | A1 | 4/2011 | Huangfu |

FOREIGN PATENT DOCUMENTS

| | | |
|---|---|---|
| JP | H11-271713 A | 10/1999 |
| JP | 2000-105364 A | 4/2000 |
| JP | 2003195260 A | 7/2003 |
| JP | 200623576 A | 1/2006 |
| JP | 2007171567 A | 7/2007 |
| JP | 2007322747 A | 12/2007 |
| JP | 2009-042405 A | 2/2009 |
| JP | 2010256420 A | 11/2010 |
| JP | 2010286557 A | 12/2010 |
| JP | 201128159 A | 2/2011 |
| JP | 201165161 A | 3/2011 |

OTHER PUBLICATIONS

International Search Report PCT/ISA/210 for International Application No. PCT/JP2012/059679 Dated on Apr. 9, 2012.

*FIG.11*
(a)
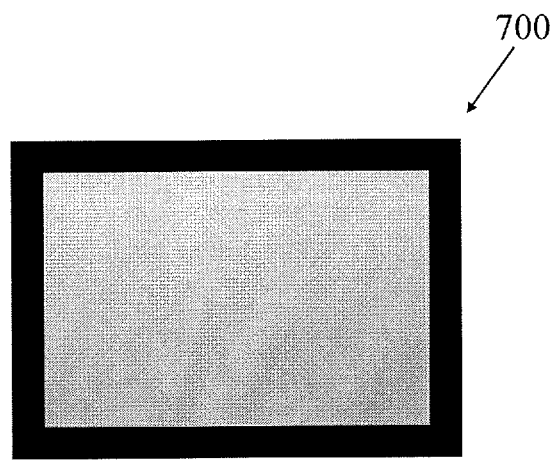
700
(b)
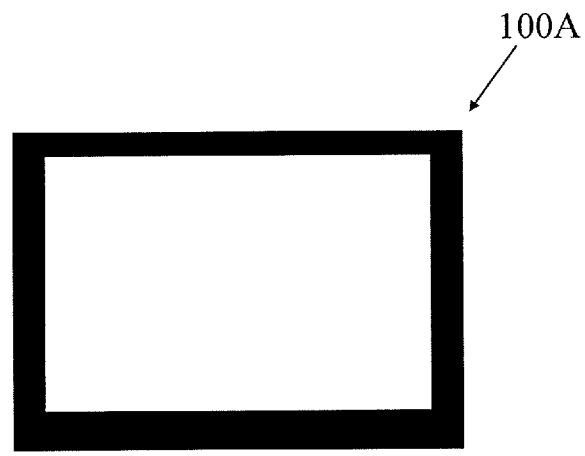
100A

FIG.24
(a)
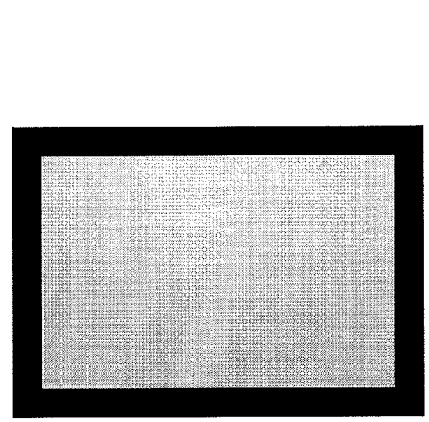
700
(b)
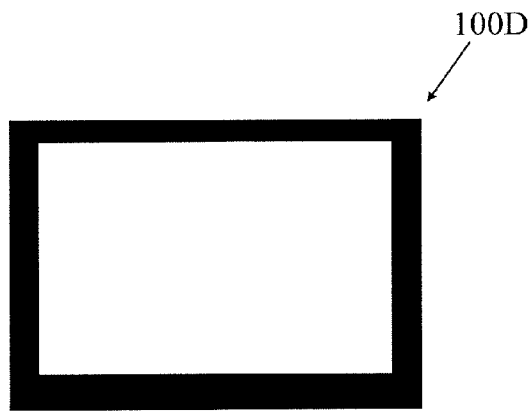
100D
FIG.25
(a)
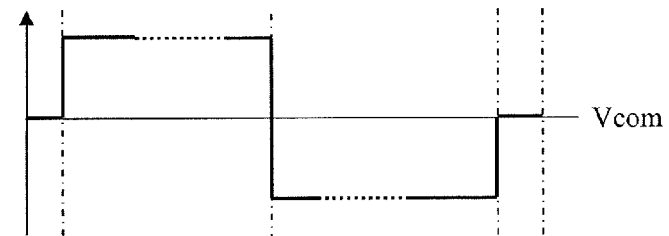
Vcom
(b)
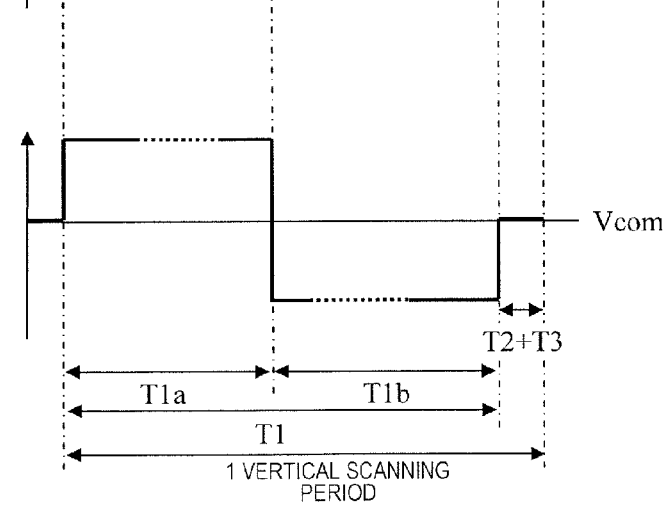
Vcom
T2+T3
T1a  T1b
T1
1 VERTICAL SCANNING PERIOD

LIQUID CRYSTAL DISPLAY DEVICE AND MULTI-DISPLAY SYSTEM

TECHNICAL FIELD

The present invention relates to a liquid crystal display device, and also relates to a multi-display system including a plurality of liquid crystal display devices.

BACKGROUND ART

Liquid crystal display devices have advantages of being thin and consuming lower power, and therefore are in wide use in various fields. Especially, active matrix liquid crystal display devices including a switching element such as a thin film transistor (TFT) or the like for each of pixels provides a high level of performance owing to a high contrast ratio and an excellent response characteristic, and therefore are used for TV, monitors, notebook computers, and the like. Recently, the market scale of the active matrix liquid crystal display devices has been rapidly expanded.

Large-size liquid crystal display devices are used as display devices for amusement facilities, information displays, digital signage devices and the like. Along with the expansion of such uses, it has been attempted to provide pseudo realization of a large-screen display device by arraying a plurality of liquid crystal display devices (occasionally referred to as "tiling technology"). Such a structure is referred to as a "multi-display system" or the like and is a target of attention as a system for realizing a high-precision large screen.

A liquid crystal display device is driven by a line sequential system. According to the line sequential system, scanning is performed in a line sequential manner from the top to the bottom of a liquid crystal panel. In an active matrix liquid crystal display device, in one vertical scanning period, TFTs are turned ON on a pixel row-by-pixel row basis by a scanning line provided for each of pixel rows, and a voltage is written to pixels on a pixel row-by-pixel row basis.

FIG. 28(a) shows an equivalent circuit of a conventionally common active matrix liquid crystal display device 700. As shown in FIG. 28(a), in the liquid crystal display device 700, a TFT 712 is provided for each of a plurality of pixels 701 located in a matrix. A gate electrode of the TFT 712 is connected to a scanning line 700g provided for each of pixel rows, and a source electrode of the TFT 712 is connected to a signal line 700s provided for each of pixel columns. A drain electrode of the TFT 712 is connected to a pixel electrode 711 provided for each of the pixels 701.

FIG. 28(b) shows waveforms of a scanning signal voltage supplied from the scanning lines 700g to the TFTs 712. FIG. 28(b) corresponds to FIG. 28(a) and shows the waveforms of the scanning signal voltage supplied from the scanning lines 700g provided for a first pixel row, a second pixel row, a third pixel row and a final pixel row. As shown in FIG. 28(b), the scanning signal voltage becomes a gate ON voltage sequentially from the first pixel row. Therefore, the timing to write a voltage to the pixels 701 varies in accordance with the pixel row. The time lag between the first pixel row (i.e., the uppermost pixel row) and the final row (i.e., the lowermost pixel row) is a time period corresponding to approximately one vertical scanning period (one frame) (i.e., about 16.7 ms in the case where the driving is performed at 60 Hz).

As can be seen, the timing to write a voltage to the pixels 701, namely, the timing at which the pixel data is rewritten and the display is switched is gradually shifted from the top to the bottom of a liquid crystal panel. Therefore, the following problem may occur when a video showing motions is displayed.

FIG. 29(a) shows a vertical bar (band extending in a top-bottom direction) 70 displayed in a still manner on a screen of the liquid crystal display device 700, and FIG. 29(b) shows the vertical bar 70 displayed in a scroll manner so as to move rightward on the screen of the liquid crystal display device 700. In the case of the still display, as shown in FIG. 29(a), the vertical bar 70 is displayed parallel to the top-bottom direction, namely, normally. By contrast, in the case of the scroll display, as shown in FIG. 29(b), the vertical bar 70 is displayed as being inclined with respect to the top-bottom direction.

FIG. 30(a) shows the vertical bar 70 displayed in a still manner on a screen of a multi-display system 800, and FIG. 30(b) shows the vertical bar 70 displayed in a scroll manner so as to move rightward on the screen of the multi-display system 800. The multi-display system 800 shown in FIGS. 30(a) and 30(b) includes 12 liquid crystal display devices 700 arrayed in three rows by four columns. In the case of the still display, as shown in FIG. 30(a), in each liquid crystal display device 700 and also in the entire multi-display system 800, the vertical bar 70 is displayed parallel to the top-bottom direction, namely, normally. By contrast, in the case of the scroll display, as shown in FIG. 30(b), in each liquid crystal display device 700 and also in the entire multi-display system 800, the vertical bar 70 is displayed as being inclined with respect to the top-bottom direction. In addition, the inclined vertical bar 70 is discontinuous between the liquid crystal display devices 700 adjacent to each other in the top-bottom direction. Herein, the term "discontinuous" does not indicate that the vertical bar 70 is not displayed in a frame area, but indicates that parts of the vertical bar 70 displayed by the liquid crystal display devices 700 are not located on a strictly straight line (namely, that the parts of the vertical bar 70 are displayed in a state of being shifted in a left-right direction).

According to a conventionally known technique, a frame memory for storing image data is provided in each of a plurality of liquid crystal display devices included in a multi-display system, and for a liquid crystal display device located in the second and subsequent rows, display is provided in a delayed manner. In this way, the continuity of the display is kept.

This technique can solve the discontinuity of the display between the liquid crystal display devices, but cannot solve the inclination of the display in each of the liquid crystal display devices. This technique also requires a frame memory for each of the liquid crystal display devices, and thus raises the production cost. In addition, when the number of the liquid crystal display devices included in the multi-display system is increased and thus the number of the liquid crystal display devices located in a column direction is increased (namely, when the number of the liquid crystal display device rows is increased), the display needs to be delayed in correspondence with the number of the liquid crystal display device rows. In the case where, for example, the liquid crystal display devices are arrayed in three columns as shown in FIG. 30(b), the display on the liquid crystal display devices on the third row (i.e., the lowermost row) needs to be delayed by two vertical scanning periods with respect to the display on the liquid crystal display devices on the first row (i.e., the uppermost row). In a liquid crystal display device, for which the display is delayed by a long time period, the frame memory needs to have a larger capacity in correspondence with the delay. This further raises the production cost.

Patent Document 1 discloses a liquid crystal display device capable of writing a voltage to all the pixels globally. FIG. 31 shows a liquid crystal display device 900 disclosed in Patent Document 1.

As shown in FIG. 31, the liquid crystal display device 900 includes a plurality of pixels 901 arrayed in a matrix. A scanning line 900g1 and a scanning line 900g2 are provided for each of pixel rows, and a signal line 900s is provided for each of pixel columns. A storage capacitor line 900c1 and a temporary capacitor line 900c2 are provided for each of the pixel rows.

The plurality of pixels 901 are each provided with a liquid crystal element LC, a storage capacitor element 922A and a temporary capacitor element 922B. The liquid crystal element LC is a capacitor element formed by a pixel electrode for each pixel 901, a part of a counter electrode that faces the pixel electrode 901, and a part of a liquid crystal layer that is located between the pixel electrode and the counter electrode (none of these components is shown).

Each pixel 901 is provided with two TFT elements 912A and 912B. Among the two TFT elements 912A and 912B, the TFT element 912A is a switching element for switching a conductive state and a non-conductive state of the temporary capacitor element 922B and the liquid crystal element LC/the storage capacitor element 922A. A gate electrode of the TFT element 912A is connected to the scanning line 900g1, and a source electrode of the TFT element 912A is connected to an end of the temporary capacitor element 922B. A drain electrode of the TFT element 912A is connected to one end of the storage capacitor element 922A and also an end of the liquid crystal element LC (i.e., pixel electrode).

The other TFT element 912B is a switching element for switching a conductive state and a non-conductive state of the temporary capacitor element 922B and the signal line 900s. A gate electrode of the TFT element 912B is connected to the scanning line 900g2, and a source electrode of the TFT element 912B is connected to the signal line 900s. A drain electrode of the TFT element 912B is connected to one end of the temporary capacitor element 922B.

The storage capacitor element 922A is a capacitor element for storing an accumulated charge in the liquid crystal element LC stably. As described above, one end of the storage capacitor element 922A is connected to the drain electrode of the TFT element 912A. The other end of the storage capacitor element 922A is connected to the storage capacitor line 900c1.

The temporary capacitor element 922B is a capacitor element for temporarily storing a video voltage corresponding to a video signal before the video signal is written to the liquid crystal element LC. As described above, one end of the temporary capacitor element 922B is connected to the source electrode of the TFT element 912A and the drain electrode of the TFT element 912B. The other end of the temporary capacitor element 922B is connected to the temporary capacitor line 900c2.

In the liquid crystal display device 900 having the above-described structure, in one vertical scanning period, first, video signals are sequentially supplied to the temporary capacitor elements 922B in a line sequential manner and temporarily stored in the capacitor elements 922B. Then, the video signals are transferred (written) to the liquid crystal elements LC and the storage capacitor elements 922A in all the pixels 901 globally.

CITATION LIST

Patent Literature

Patent Document 1: Japanese Laid-Open Patent Publication No. 2010-256420

SUMMARY OF INVENTION

Technical Problem

Use of the liquid crystal display device 900 disclosed in Patent Document 1 for a multi-display system (although Patent Document 1 does not include any reference to such an application at all) is considered to solve the two problems caused when the vertical bar is displayed in a scroll manner, namely, the discontinuity of the display between the liquid crystal display devices and also the inclination of the display in each liquid crystal display device.

However, in the liquid crystal display device 900, when the video voltage is transferred to the liquid crystal elements LC and the storage capacitor elements 922A, a voltage (data) written in the immediately previous vertical scanning period is left in the liquid crystal elements LC and the storage capacitor elements 922A. Therefore, in actuality, a desired voltage cannot be written to the liquid crystal elements LC and the storage capacitor elements 922A. In order to write a desired voltage, a video voltage needs to be supplied to the temporary capacitor elements 922B in consideration of the level of the voltage written in the immediately previous vertical scanning period (naturally, may be significantly different on a pixel 901-by-pixel 901 basis). A circuit configuration for realizing such voltage supply may be significantly complicated or may raise the production cost.

The present invention made in light of the above-described problems has an object of providing a liquid crystal display device capable of writing a desired voltage to all the pixels globally with a simple structure and a multi-display system including such liquid crystal display devices.

Solution to Problem

A liquid crystal display device in an embodiment according to the present invention includes a plurality of pixels arrayed in a matrix including a plurality of pixel rows and a plurality of pixel columns; a pixel electrode provided for each of the plurality of pixels; a counter electrode facing the pixel electrodes; a liquid crystal layer provided between the pixel electrodes and the counter electrode; a first scanning line, a second scanning line and a third scanning line which are provided for each of the plurality of pixel rows; a first signal line and a second signal line which are provided for each of the plurality of pixel columns; a pixel capacitor provided for each of the plurality of pixels; a temporary storage capacitor provided for each of the plurality of pixels, the temporary storage capacitor temporarily storing a voltage to be written to the pixel capacitor; first switching elements each of which is to be turned ON/OFF by a scanning signal voltage supplied from the first scanning line and controls electrical connection between the first signal line and the temporary storage capacitor; second switching elements each of which is to be turned ON/OFF by a scanning signal voltage supplied from the second scanning line and controls electrical connection between the temporary storage capacitor and the pixel capacitor; and third switching elements each of which is to be turned ON/OFF by a scanning signal voltage supplied from the third scanning line and controls electrical connection between the second signal line and the pixel capacitor.

In a preferable embodiment, an optional vertical scanning period includes a first period, a second period subsequent to the first period, and a third period subsequent to the second period; in the first period, the first switching elements are turned ON on a pixel row-by-pixel row basis, so that a display signal voltage is supplied from the first signal lines to the temporary storage capacitors; in the second period after the display signal voltage is supplied to the temporary storage capacitors in all of the plurality of pixels, the third switching elements in all the plurality of pixels are turned ON, so that a reset voltage is supplied from the second signal lines to the pixel capacitors; and in the third period after a voltage written to the pixel capacitors in an immediately previous vertical scanning period is reset by the reset voltage, the second switching elements in all the plurality of pixels are turned ON, so that the voltage stored in the temporary storage capacitors is written to the pixel capacitors in all the plurality of pixels globally.

In a preferable embodiment, the reset voltage supplied from the second signal lines to the pixel capacitors in the second period has substantially the same level as that of a voltage supplied to the counter electrode.

In a preferable embodiment, in a first half of the first period, a display signal voltage of a first polarity is supplied from the first signal lines to the temporary storage capacitors in the pixels in a half of the plurality of pixel rows, which include the plurality of pixels; and in a second half of the first period, a display signal voltage of a second polarity opposite to the first polarity is supplied from the first signal lines to the temporary storage capacitors in the pixels in another half of the plurality of pixels.

In a preferable embodiment, in each of the first half and the second half of the first period, the display signal voltage is supplied from the first signal lines to the temporary storage capacitors in every other pixel row.

In a preferable embodiment, the liquid crystal display device according to the present invention further includes a signal line driving circuit that supplies a voltage to the first signal line and the second signal line. In the first period, the voltage supplied from the signal line driving circuit to the first signal line, and the voltage supplied from the signal line driving circuit to the second signal line, have substantially the same level as each other in opposite polarities from each other with respect to a voltage supplied to the counter electrode.

In a preferable embodiment, the first signal lines and the second signal lines are each divided into a first part located in a relatively upper area in a column direction and a second part located in a relatively lower area in the column direction.

Alternatively, a liquid crystal display device in an embodiment according to the present invention includes a plurality of pixels arrayed in a matrix including a plurality of pixel rows and a plurality of pixel columns; a pixel electrode provided for each of the plurality of pixels; a counter electrode facing the pixel electrodes; a liquid crystal layer provided between the pixel electrodes and the counter electrode; a first scanning line, a second scanning line and a third scanning line which are provided for each of the plurality of pixel rows; a first signal line and a second signal line which are provided for each of the plurality of pixel columns; a pixel capacitor provided for each of the plurality of pixels; a temporary storage capacitor provided for each of the plurality of pixels, the temporary storage capacitor temporarily storing a voltage to be written to the pixel capacitor; first switching elements each of which is to be turned ON/OFF by a scanning signal voltage supplied from the first scanning line; second switching elements each of which is to be turned ON/OFF by a scanning signal voltage supplied from the second scanning line and controls electrical connection between the temporary storage capacitor and the pixel capacitor; and third switching elements each of which is to be turned ON/OFF by a scanning signal voltage supplied from the third scanning line. In each of the pixels in a part of the plurality of pixel rows, which include the plurality of pixels, the first switching element controls electrical connection between the first signal line and the temporary storage capacitor, and the third switching element controls electrical connection between the second signal line and the pixel capacitor; and in each of the pixels in the rest of the plurality of pixel rows, the first switching element controls electrical connection between the second signal line and the temporary storage capacitor, and the third switching element controls electrical connection between the first signal line and the pixel capacitor.

In a preferable embodiment, an optional vertical scanning period includes a first period, a second period subsequent to the first period, and a third period subsequent to the second period; in the first period, in the part of the plurality of pixel rows, the first switching elements are turned ON on a pixel row-by-pixel row basis, so that a display signal voltage is supplied from the first signal lines to the temporary storage capacitors; in the first period, in the rest of the plurality of pixel rows, the first switching elements are turned ON on a pixel row-by-pixel row basis, so that a display signal voltage is supplied from the second signal lines to the temporary storage capacitors; in the second period after the display signal voltage is supplied to the temporary storage capacitors in all of the plurality of pixels, the third switching elements in all the plurality of pixels are turned ON, so that a reset voltage is supplied from the first signal lines or the second signal lines to the pixel capacitors; and in the third period after a voltage written to the pixel capacitors in an immediately previous vertical scanning period is reset by the reset voltage, the second switching elements in all the plurality of pixels are turned ON, so that the voltage stored in the temporary storage capacitors is written to the pixel capacitors in all the plurality of pixels globally.

In a preferable embodiment, the reset voltage supplied from the first signal lines or the second signal lines to the pixel capacitors in the second period has substantially the same level as that of a voltage supplied to the counter electrode.

In a preferable embodiment, the part of the plurality of pixel rows is a half of the plurality of pixel rows; and the rest of the plurality of pixel rows is another half of the plurality of pixel rows.

In a preferable embodiment, the liquid crystal display device according to the present invention includes an active matrix substrate including the pixel electrodes, the first scanning lines, the second scanning lines, the third scanning lines, the first signal lines, the second signal lines, the first switching elements, the second switching elements, and the third switching elements; and a counter substrate including the counter electrode and facing the active matrix substrate. The temporary storage capacitors are each formed of a first electrode provided in the active matrix substrate and formed of a conductive film which is the same as that of the pixel electrodes, a second electrode provided in the counter substrate and formed of a conductive film which is the same as that of the counter electrode, and a dielectric layer which is provided between the first electrode and the second electrode and is different from the liquid crystal layer.

In a preferable embodiment, the liquid crystal display device according to the present invention includes an active matrix substrate including the pixel electrodes, the first scanning lines, the second scanning lines, the third scanning lines, the first signal lines, the second signal lines, the first switching elements, the second switching elements, and the third switching elements; and a counter substrate including the counter electrode and facing the active matrix substrate. The temporary storage capacitors are each formed of the counter electrode, another electrode provided in the counter substrate and overlapping the counter electrode, and a dielectric layer provided between the counter electrode and the another electrode.

A multi-display system in an embodiment according to the present invention includes a plurality of liquid crystal display devices each of which is a liquid crystal display device having any of the above-described structures. The plurality of liquid crystal display devices include two liquid crystal display devices located so as to be adjacent to each other in a column direction.

Advantageous Effects of Invention

According to an embodiment of the present invention, a liquid crystal display device capable of writing a desired voltage to all the pixels globally by with simple structure is provided. Also according to an embodiment of the present invention, a multi-display system including such liquid crystal display devices is provided.

BRIEF DESCRIPTION OF DRAWINGS

FIG. 11(a) shows the plain white display provided by the conventional liquid crystal display device 700 driven by the dot inversion driving, and FIG. 11(b) shows the plain white display provided by the liquid crystal display device 100A.

FIG. 24(a) shows plain white display provided by the conventional liquid crystal display device 700 having a size of 60 inches or larger, and FIG. 24(b) shows plain white display provided by the liquid crystal display device 100D.

FIGS. 25(a) and 25(b) show waveforms of voltages supplied from the signal line driving circuit to the first signal line s1 and the second signal line s2 for providing plain white display by the liquid crystal display device 100D.

DESCRIPTION OF EMBODIMENTS

Hereinafter, embodiments of the present invention will be described with reference to the drawings. The present invention is not limited to the following embodiments.

(Embodiment 1)

Figure 1:
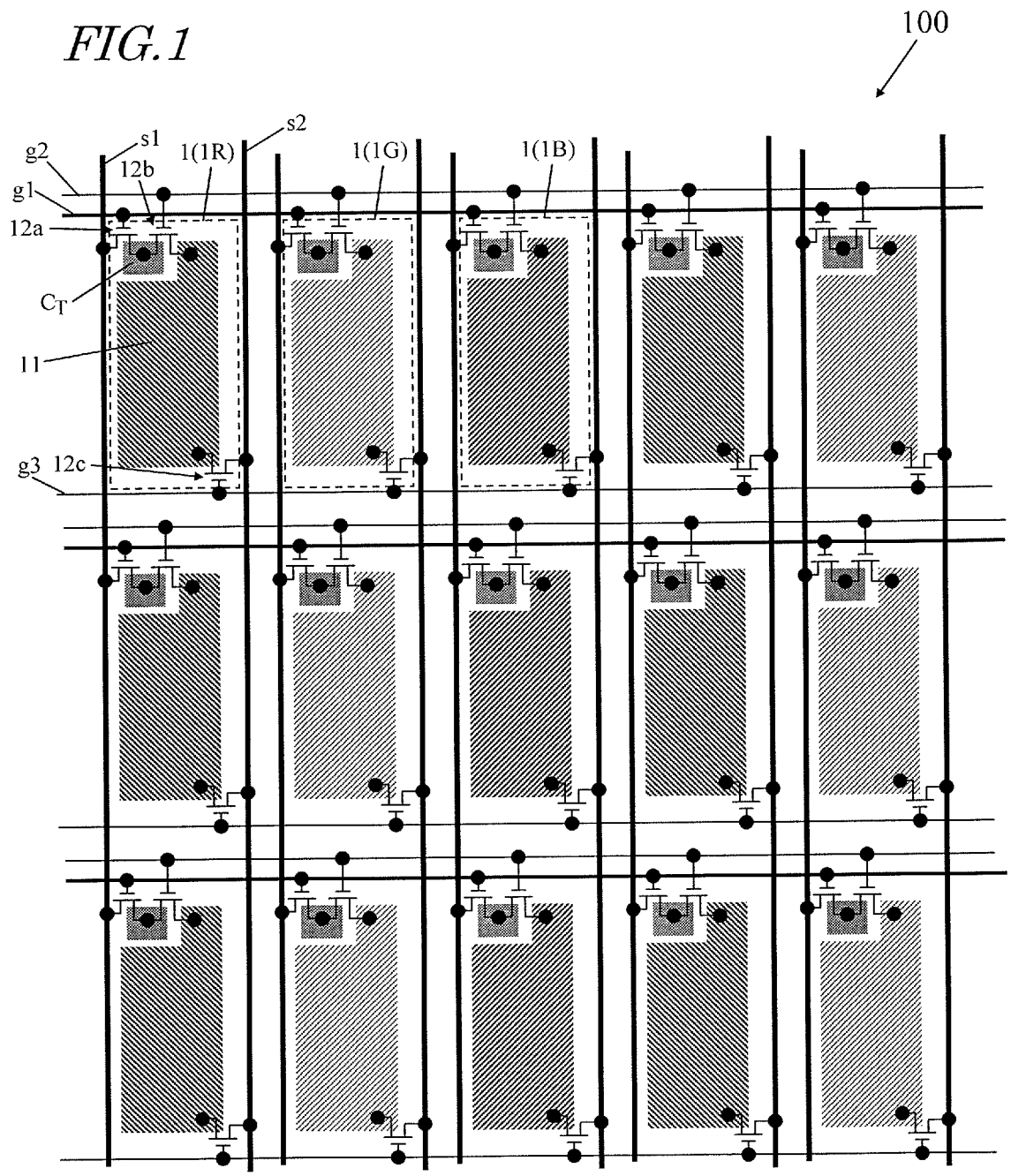
FIG. 1 is a plan view schematically showing a liquid crystal display device 100 in a preferable embodiment according to the present invention.
Figure 2:
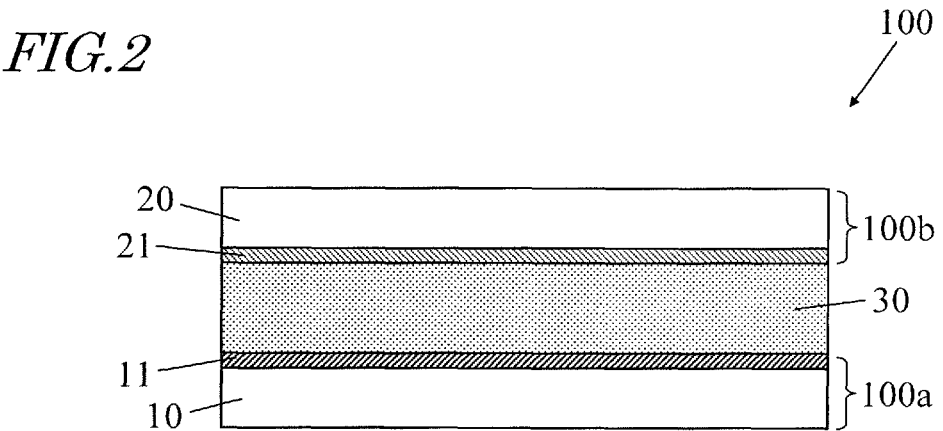
FIG. 2 is a cross-sectional view schematically showing the liquid crystal display device 100 in a preferable embodiment according to the present invention.

FIG. 1 and FIG. 2 show a liquid crystal display device 100 in this embodiment. FIG. 1 schematically shows a planar structure of the liquid crystal display device 100, and FIG. 2 is a cross-sectional view schematically showing the liquid crystal display device 100.

As shown in FIG. 1, the liquid crystal display device 100 includes a plurality of pixels 1 arrayed in a matrix including a plurality of rows and a plurality of columns. The plurality of pixels 1 include red pixels 1R for displaying red, green pixels 1G for displaying green, and blue pixels 1B for displaying blue. A red pixel 1R, a green pixel 1G and a blue pixel 1B form a color display pixel, which is a minimum unit for color display. A number of color display pixels corresponding to the resolution are located in a row direction (horizontal direction) and a column direction (vertical direction) (e.g., in the case of full HD, there are 1920 color display pixels in the row direction and 1080 color display pixels in the column direction).

As shown in FIG. 1 and FIG. 2, the liquid crystal display device 100 includes a pixel electrode 11 provided for each of the plurality of pixels 1 (FIG. 2 shows an area corresponding to one pixel 1 in a simplified manner), a counter electrode 21 facing the pixel electrodes 11, and a liquid crystal layer 30 provided between the pixel electrodes 11 and the counter electrode 21. The pixel electrodes 11 are provided in an active matrix substrate (hereinafter, referred to as a "TFT substrate") 100a, and the counter electrode 21 is provided in a counter substrate (occasionally referred to as a "color filter substrate") 100b. On an insulating substrate (typically, a glass substrate) 10 of the TFT substrate 100a, the pixel electrodes 11 and also other components (alignment film, lines described later, switching elements, etc.) are provided. On an insulating substrate (typically, a glass substrate) 20 of the counter substrate 100b, the counter electrode 21 and also other components (alignment film, color filters, etc.) are provided.

The pixel electrode 11, the counter electrode 21 and the liquid crystal layer 30 located therebetween form a liquid crystal capacitor. A pixel capacitor including the liquid crystal capacitor is provided for each of the plurality of pixels. Each pixel 1 may be provided with a storage capacitor electrically connected parallel to the liquid crystal capacitor. In the case where the storage capacitor is provided, the pixel capacitor includes the liquid crystal capacitor and the storage capacitor.

Figure 3:
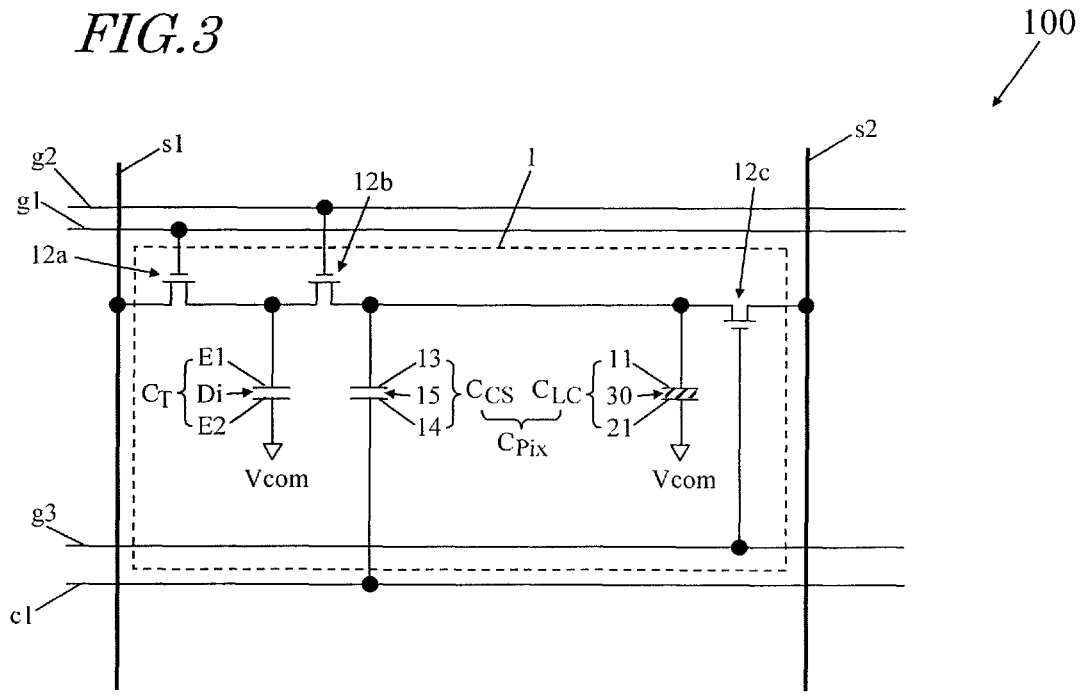
FIG. 3 is an equivalent circuit diagram showing an area corresponding to one pixel 1 of the liquid crystal display device 100.

Referring to FIG. 1 again, a more specific structure of the liquid crystal display device 100 will be described. In the following description, FIG. 3 will also be referred to. FIG. 3 is an equivalent circuit diagram showing an area corresponding to one pixel 1 of the liquid crystal display device 100. FIG. 3 shows the equivalent circuit in the case where a pixel capacitor $C_{Pix}$ includes a liquid crystal capacitor $C_{LC}$ and a storage capacitor $C_{CS}$, namely, in the case where each pixel 1 is provided with the storage capacitor $C_{CS}$.

As shown in FIG. 1 and FIG. 3, in the liquid crystal display device 100, a first scanning line g1, a second scanning line g2 and a third scanning line g3 are provided for each of pixel rows. Namely, three scanning lines are located for one pixel row. A first signal line s1 and a second signal line s2 are provided for each of pixel columns. Namely, two signal lines are located for one pixel column. In the case where the storage capacitor $C_{CS}$ is provided, a storage capacitor line c1 is provided for each pixel row as shown in FIG. 3.

In the liquid crystal display device 100 in this embodiment, each pixel 1 is provided with a temporary storage capacitor $C_T$. The temporary storage capacitor $C_T$ temporarily stores a voltage to be written to the pixel capacitor $C_{Pix}$ as described later in detail. The temporary storage capacitor $C_T$ includes a pair of electrodes facing each other (hereinafter, referred to as a "first electrode" and a "second electrode") E1 and E2, and a dielectric layer Di located between the first electrode E1 and the second electrode E2. The storage capacitor $C_{CS}$ includes a pair of electrodes facing each other (referred to as a "storage capacitor electrode" and a "storage capacitor counter electrode") 13 and 14, and a dielectric layer 15 located between the storage capacitor electrode 13 and the storage capacitor counter electrode 14. The storage capacitor electrode 13 is electrically connected to the pixel electrode 11. The storage capacitor counter electrode 14 is electrically connected to the storage capacitor line c1 and is supplied with a prescribed voltage (referred to as a "CS voltage") from the storage capacitor line c1.

Each pixel 1 is provided with three switching elements. Specifically, as shown in FIG. 1 and FIG. 3, first, second and third transistors (TFTs) 12a, 12b and 12c are provided for one pixel.

A gate electrode of the first TFT 12a is electrically connected to the first scanning line g1, and therefore the first TFT 12a is turned ON/OFF by a scanning signal voltage supplied from the first scanning line g1. A source electrode of the first TFT 12a is electrically connected to the first signal line s1, and a drain electrode of the first TFT 12a is electrically connected to the first electrode E1 of the temporary storage capacitor $C_T$. Therefore, the first TFT (first switching element) 12a controls electrical connection between the first signal line s1 and the temporary storage capacitor $C_T$.

A gate electrode of the second TFT 12b is electrically connected to the second scanning line g2, and therefore the second TFT 12b is turned ON/OFF by a scanning signal voltage supplied from the second scanning line g2. A source electrode of the second TFT 12b is electrically connected to the first electrode E1 of the temporary storage capacitor $C_T$, and a drain electrode of the second TFT 12b is electrically connected to the pixel electrode 11. Therefore, the second TFT (second switching element) 12b controls electrical connection between the temporary storage capacitor $C_T$ and the pixel capacitor $Cp_{Pix}$.

A gate electrode of the third TFT 12c is electrically connected to the third scanning line g3, and therefore the third TFT 12c is turned ON/OFF by a scanning signal voltage supplied from the third scanning line g3. A source electrode of the third TFT 12c is electrically connected to the second signal line s2, and a drain electrode of the third TFT 12c is electrically connected to the pixel electrode 11. Therefore, the third TFT (third switching element) 12c controls electrical connection between the second signal line s2 and the pixel capacitor $C_{Pix}$.

Figure 4:
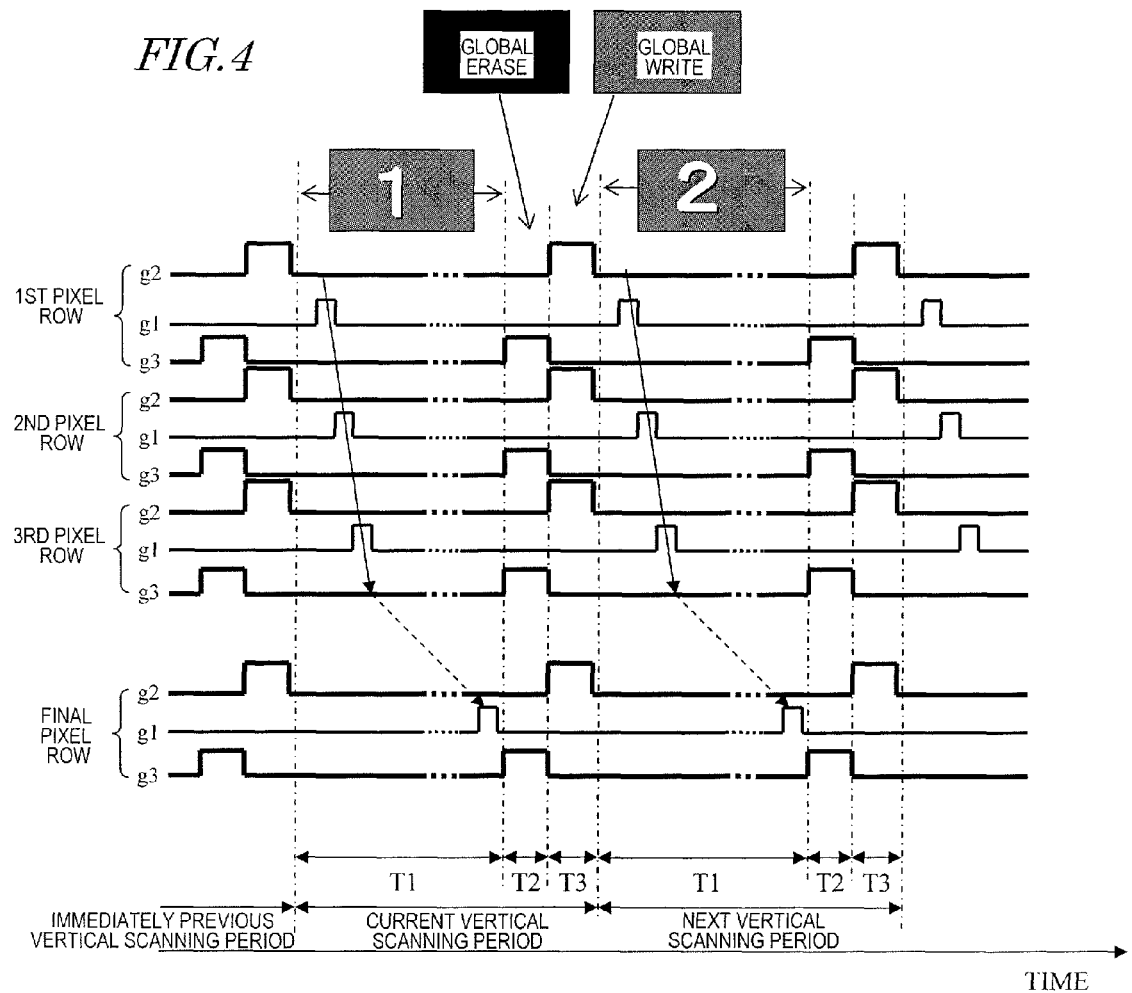
FIG. 4 shows waveforms of scanning signal voltages supplied from first scanning lines g1, second scanning lines g2 and third scanning lines g3 of the liquid crystal display device 100.

Now, with reference to FIG. 4, a method for driving the liquid crystal display device 100 will be described. FIG. 4 shows waveforms of the scanning signal voltages supplied from the first scanning lines g1, the second scanning lines g2 and the third scanning lines g3. FIG. 4 shows the timing at which gate ON voltages are input to the first TFTs 12a, the second TFTs 12b and the third TFTs 12c from the first scanning lines g1, the second scanning lines g2 and the third scanning lines g3. FIG. 4 shows the waveforms of the scanning signal voltages supplied from the first scanning lines g1, the second scanning lines g2 and the third scanning lines g3 of the first pixel row, the second pixel row, the third pixel row and the final pixel row as examples.

As shown in FIG. 4, an optional one vertical scanning period includes a first period T1, a second period T2 subsequent to the first period T1, and a third period T3 subsequent to the second period T2. One vertical scanning period (typically, one frame) is about 16.7 ms in the general case where the driving is performed at 60 Hz, and is about 8.3 ms in the case where the driving is performed at 120 Hz (i.e., at double speed), which is recently adopted in a part of models of liquid crystal TVs. FIG. 4 also shows screens in each of the first period T1, the second period T2 and the third period T3 above the voltage waveforms.

First, in the first period T1, a gate ON voltage is input from the first scanning lines g1 to the first TFTs 12a sequentially from the first pixel row. Thus, the first TFTs 12a are turned ON on a pixel row-by-pixel row basis. As a result, a display signal voltage is supplied from the first signal lines s1 to the temporary storage capacitors $C_T$ on a pixel row-by-pixel row basis. Namely, in the first period T1, voltage supply to, and accumulation in, the temporary storage capacitors $C_T$ in each pixel row is performed in a line sequential manner. The second electrode E2 of each temporary storage capacitor $C_T$ is given a potential suitable to the voltage accumulation. For example, the second electrode E2 is supplied with a voltage of the same level as that of a common voltage Vcom supplied to the counter electrode 21 (see FIG. 3). The screen provides display based on pixel data of the immediately previous vertical scanning period (FIG. 3 shows a case where the numerical figures "3" is displayed).

Next, in the second period T2 (naturally, after the display signal voltage is supplied to the temporary storage capacitors $C_T$ in all the pixels 1), a gate ON voltage is input from the third scanning lines g3 of all the pixel rows to the third TFTs 12c. Thus, the third TFTs 12c in all the pixels 1 are turned ON. As a result, a reset voltage is supplied from the second signal lines s2 to the pixel capacitors $C_{Pix}$ in all the pixels 1. The reset voltage resets a voltage written to the pixel capacitors $C_{Pix}$ in the immediately previous vertical scanning period. As can be seen, in the second period T2, pixel data in the immediately previous vertical scanning period is erased from all the pixels 1 globally. The reset voltage is of the same level (i.e., is common) for all the pixels 1, and typically is of substantially the same level as that of the common voltage Vcom supplied to the counter electrode 21.

Next, in the third period T3, a gate ON voltage is input from the second scanning lines g2 of all the pixel rows to the second TFTs 12b. Thus, the second TFTs 12b in all the pixels 1 are turned ON. As a result, the voltage stored in the temporary storage capacitors $C_T$ is written to the pixel capacitors $C_{Pix}$ in all the pixels 1 globally. As can be seen, in the third period T3, pixel data is written to all the pixels 1 globally.

After this, the liquid crystal display device 100 is driven in the next vertical scanning period in substantially the same manner. In the next vertical scanning period, in the first period T1, the screen provides display based on the pixel data of the current vertical scanning period (FIG. 3 shows a case where the numerical figures "2" is displayed).

As described above, in the liquid crystal display device 100 in this embodiment, since the temporary storage capacitor $C_T$ is provided in each pixel 1, a voltage can be written to the pixel capacitors $C_{Pix}$ in all the pixels 1 globally in a certain period (third period T3) of one vertical scanning period. Therefore, the liquid crystal display device 100 can display a video showing motions with no problem when being used independently or in a multi-display system.

Figure 5:
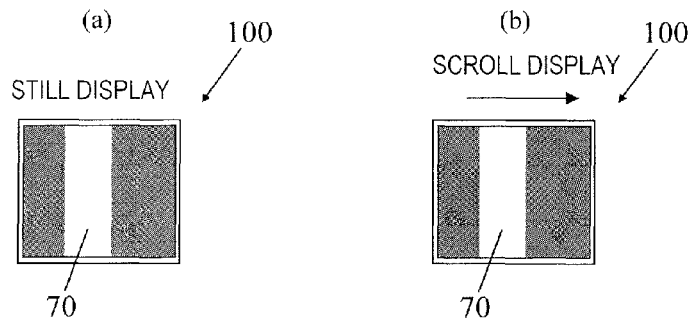
FIG. 5(a) shows a vertical bar 70 displayed in a still manner on a screen of the liquid crystal display device 100.
FIG. 5(b) shows the vertical bar 70 displayed in a scroll manner so as to move rightward on the screen of the liquid crystal display device 100.

FIG. 5(a) shows a vertical bar (band extending in a top-bottom direction) 70 displayed in a still manner on a screen of the liquid crystal display device 100, and FIG. 5(b) shows the vertical bar 70 displayed in a scroll manner so as to move rightward on the screen of the liquid crystal display device 100. In the case of the still display, as shown in FIG. 5(a), the vertical bar 70 is displayed parallel to the top-bottom direction, namely, normally. In the case of the scroll display also, as shown in FIG. 5(b), the vertical bar 70 is displayed normally.

Figure 6:
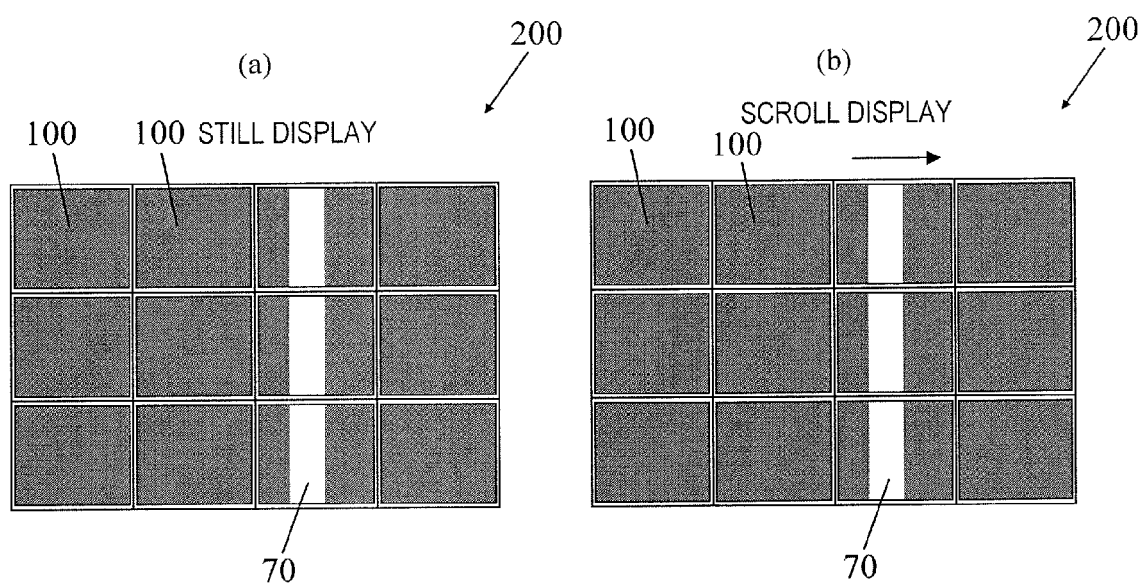
FIG. 6(a) shows the vertical bar 70 displayed in a still manner on a screen of a multi-display system 200.
FIG. 6(b) shows the vertical bar 70 displayed in a scroll manner so as to move rightward on the screen of the multi-display system 200.

FIG. 6(a) shows the vertical bar 70 displayed in a still manner on a screen of a multi-display system 200, and FIG. 6(b) shows the vertical bar 70 displayed in a scroll manner so as to move rightward on the screen of the multi-display system 200. The multi-display system 200 shown in FIGS. 6(a) and 6(b) includes a plurality of liquid crystal display devices, more specifically, 12 liquid crystal display devices 100 arrayed in three rows by four columns. In the case of the still display, as shown in FIG. 6(a), in each liquid crystal display device 100 and also in the entire multi-display system 200, the vertical bar 70 is displayed parallel to the top-bottom direction, namely, normally. In the case of the scroll display also, as shown in FIG. 6(b), in each liquid crystal display device 100 and also in the entire multi-display system 200, the vertical bar 70 is displayed normally. As shown in FIG. 6(b), parts of the vertical bar 70 are located on one straight line and continuous between the liquid crystal display devices 100 adjacent to each other in the column direction.

In the liquid crystal display device 100 in this embodiment, the third scanning lines g3, the second signal lines s2 and the third TFTs 12c are provided. Owing to this, before the voltage is written to the pixel capacitors $C_{Pix}$ (specifically, in the second period T2), the voltage written to the pixel capacitors $C_{Pix}$ in the immediately previous vertical scanning period can be reset (namely, the pixel data in the immediately previous vertical scanning period can be erased). Therefore, in the liquid crystal display device 100, a desired voltage can be written to the pixel capacitors $C_{Pix}$ with no consideration of the level of the voltage written in the immediately previous vertical scanning period (naturally, may be significantly different on a pixel-by-pixel basis). Thus, the circuit configuration is not made complicated due to the need to consider the level of the voltage written in the immediately previous vertical scanning period, or the production cost is not raised either.

As described above, the liquid crystal display device 100 can write a desired voltage to all the pixels 1 globally with a simple structure.

In the example shown in FIG. 1 and FIG. 3, the second scanning line g2, the first scanning line g1 and the third scanning line g3 are located in this order from the top to the bottom for each pixel row, and the first signal line s1 and the second signal line s2 are located in this order from the left to the right for each pixel column. The positional relationship of the lines is not limited to this.

In the liquid crystal display device 100 in this embodiment, voltage supply to the temporary storage capacitors $C_T$ is performed in a line sequential manner in the first period T1, and then the pixel data erasure in the second period T2 and the global pixel data write in the third period T3 are performed. The time period in which the voltage supply to the temporary storage capacitors $C_T$ is performed in each pixel row in the first period T1 does not need to be shorter than one horizontal scanning period in a conventionally common liquid crystal display device.

In general, in one vertical scanning period of a display device, pixel data is not written at all the instances, but there is a blank period in which there is no pixel data to be written. Also in an active matrix liquid crystal display device, one vertical scanning period includes a data write period in which pixel data is written in a line sequential manner and also a blank period.

The blank period in a conventional liquid crystal display device is allocated to the second period T2 and the third period T3 (namely, the immediately previous pixel data is erased and the pixel data is written globally in the blank period). Owing to this, the data write period in the conventional liquid crystal display device can be totally allocated to the first period T1. As a result, the time period in which the voltage supply to the temporary storage capacitors $C_T$ is performed in each pixel row can have the same length as that of one horizontal scanning period in the conventional liquid crystal display device. Even when the blank period in the conventional liquid crystal display device is allocated to the second period T2 and the third period T3, a time period corresponding to several horizontal scanning periods can be provided as each of the second period T2 and the third period T3.

(Embodiment 2)

Figure 7:
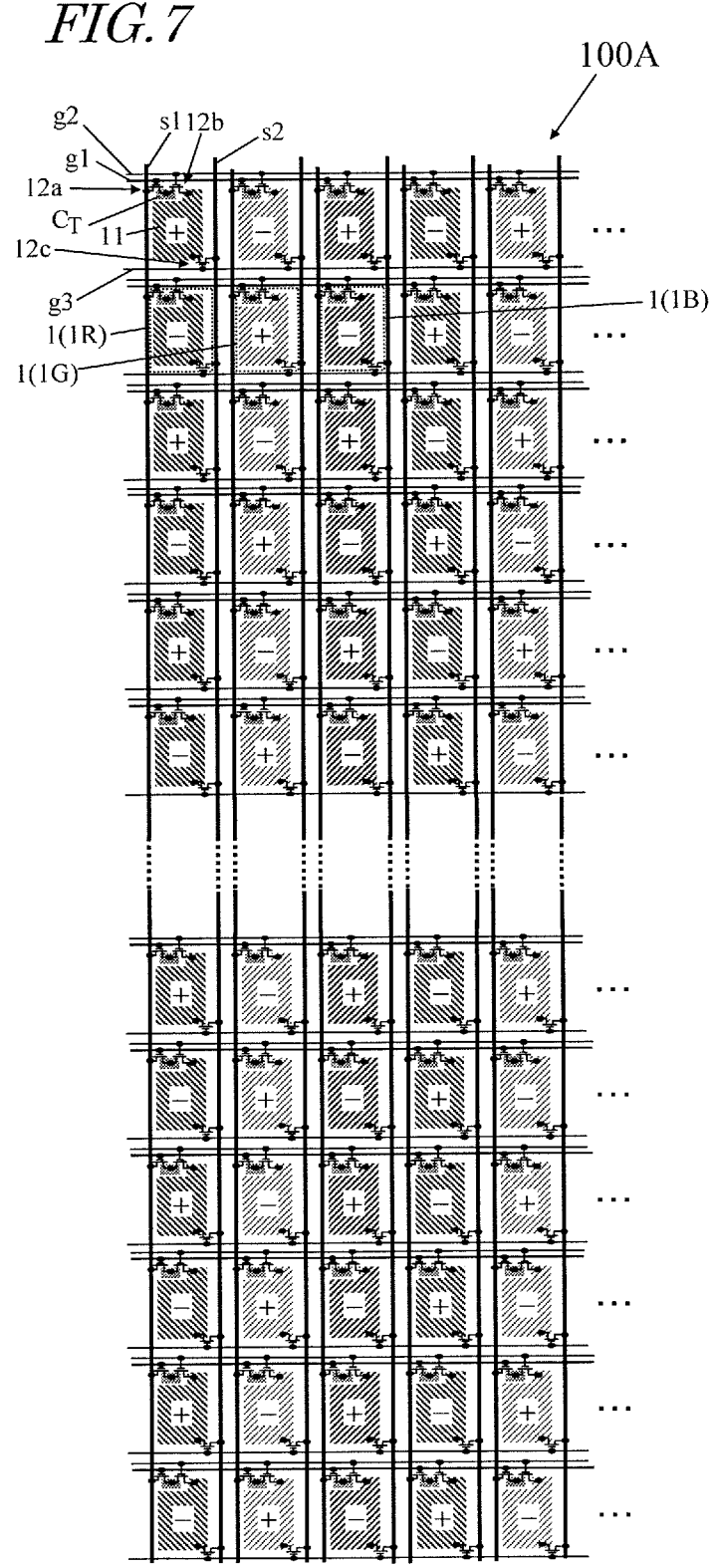
FIG. 7 is a plan view schematically showing a liquid crystal display device 100A in a preferable embodiment according to the present invention.

FIG. 7 shows a liquid crystal display device 100A in this embodiment. FIG. 7 schematically shows a planar structure of the liquid crystal display device 100A. Hereinafter, differences of the liquid crystal display device 100A from the liquid crystal display device 100 in Embodiment 1 will be mainly described. In FIG. 7, components having the same functions as those of the liquid crystal display device 100 will bear identical reference signs thereto. This is also applicable to the following figures.

Like the liquid crystal display device 100, the liquid crystal display device 100A includes a first scanning line g1, a second scanning line g2 and a third scanning line g3 provided for each pixel row, a first signal line s1 and a second signal line s2 provided for each pixel column, and a temporary storage capacitor $C_T$ provided for each pixel 1. Like the liquid crystal display device 100, the liquid crystal display device 100A includes a first TFT 12a, a second TFT 12b and a third TFT 12c provided for each pixel 1. The first TFT 12a controls electrical connection between the first signal line s1 and the temporary storage capacitor $C_T$. The second TFT 12b controls electrical connection between the temporary storage capacitor $C_T$ and the pixel capacitor $C_{Pix}$. The third TFT 12c controls electrical connection between the second signal line s2 and the pixel capacitor $C_{Pix}$.

As can be seen, the liquid crystal display device 100A has the same panel structure as that of the liquid crystal display device 100. However, the liquid crystal display device 100A is different from the liquid crystal display device 100 in the order in which a voltage is supplied to the temporary storage capacitors $C_T$ in each pixel row in the first period T1, namely, the timing at which a gate ON voltage is input from the first scanning lines g1 to the first TFTs 12a. Owing to this, the liquid crystal display device 100A can prevent luminance non-uniformity which would be otherwise occurred when the line inversion driving or the dot inversion driving is performed. Hereinafter, this will be described more specifically.

A general liquid crystal display device is AC-driven in order to prevent a DC voltage from being applied to the liquid crystal layer. Namely, the direction of the electric field generated in the liquid crystal layer is inverted at a certain time interval, so that an electric field in a certain direction (DC voltage) is not left when a time average is found. A voltage applied to a part of the liquid crystal layer corresponding to each pixel of an active matrix liquid crystal display device corresponds to a difference between a common voltage (Vcom) supplied to the counter electrode and a display signal voltage supplied to the pixel electrode. This means that when AC driving is performed, the polarity of the display signal voltage with respect to the common voltage supplied to the counter electrode is inverted at a certain time interval. The cycle at which the polarity of the display signal voltage is inverted is, for example, one vertical scanning period (typically, one frame).

However, the transmittance of the pixel is slightly different between when a positive voltage is applied to the liquid crystal layer and when a negative voltage is applied to the liquid crystal layer. Therefore, when the same polarity of voltage is written to all the pixels in the liquid crystal panel, fluctuation of the luminance is observed at a cycle of two vertical scanning periods (at a cycle of 30 Hz when the driving is performed at 60 Hz) (referred to as "flicker"). Thus, usually in a liquid crystal display device, the number of the pixels to which a positive voltage is written and the number of the pixels to which a negative voltage is written are made equal to each other, and these two types of pixels are equally distributed spatially in a liquid crystal panel.

Driving by which the pixels are dispersed such that the polarity of an applied voltage is inverted every pixel row is referred to as "line inversion driving". Driving by which the pixels are dispersed such that the polarity of an applied voltage is inverted every pixel is referred to as "dot inversion driving". In the case of the line inversion, the power consumption can be reduced, but the change in the luminance occurring every pixel row may be occasionally perceived in a large screen. Therefore, in a large-screen liquid crystal display device, the dot inversion driving is often adopted. FIG. 7 shows the polarities of the voltages applied to parts of the liquid crystal layer 30 corresponding to the pixels 1 when the dot inversion driving is performed (the pixel is represented with "+" when a positive voltage is applied thereto, and the pixel is represented with "−" when a negative voltage is applied thereto).

In a conventional liquid crystal display device, regardless of whether the line inversion driving or the dot inversion driving is adopted, a signal line is supplied with a voltage of a different polarity every horizontal scanning period. Therefore, when the resolution of the liquid crystal panel is increased (namely, when the number of pixel rows is increased), the cycle at which the positive voltage and the negative voltage is switched to each other is shortened. As a result, the potential of the signal line does not reach a desired level. For this reason, luminance non-uniformity described later occurs.

Figure 8:
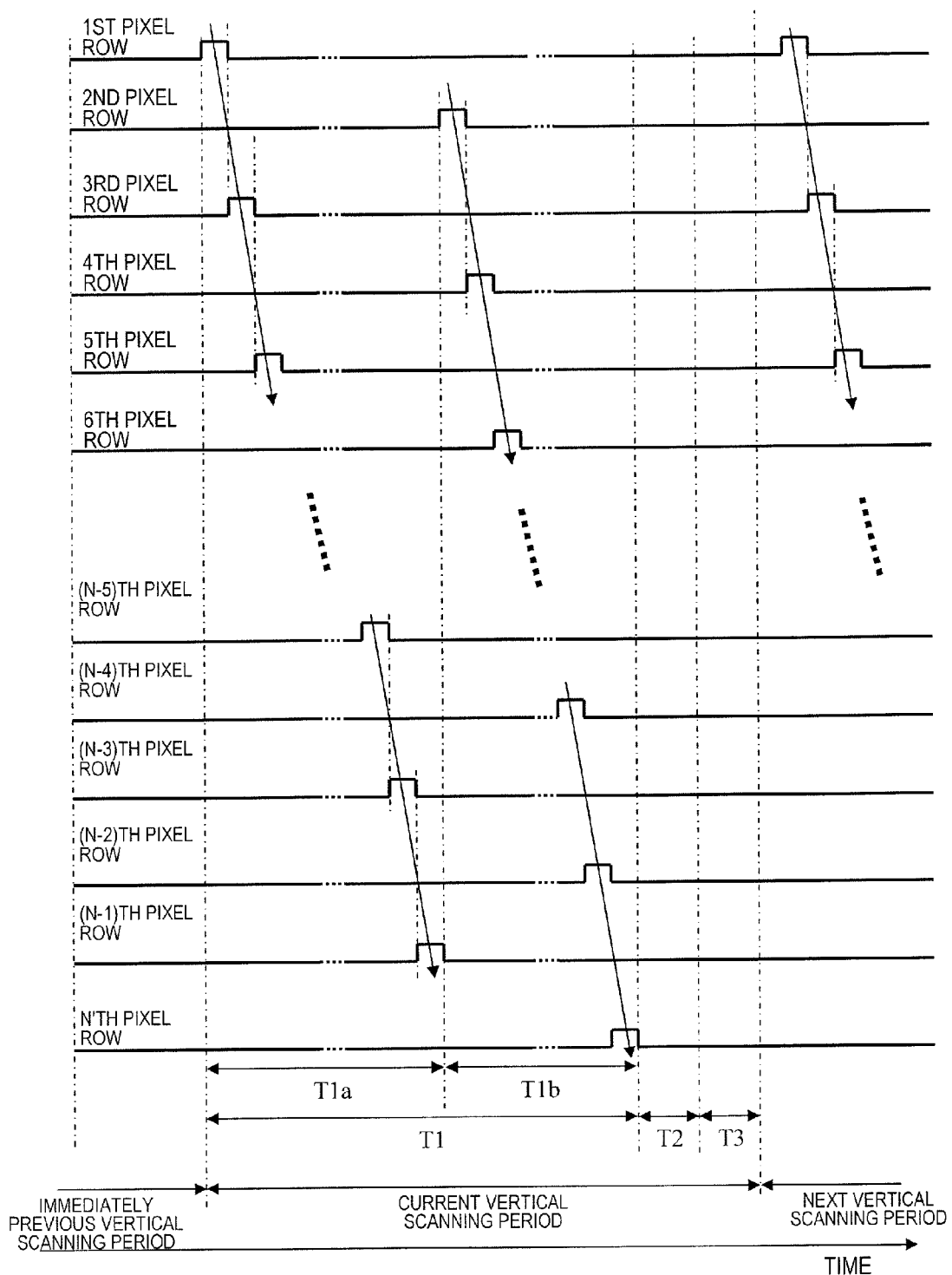
FIG. 8 shows waveforms of scanning signal voltage supplied from the first scanning lines g1 when line inversion driving or dot inversion driving is performed in the liquid crystal display device 100A.

By contrast, in the liquid crystal display device 100A in this embodiment, such luminance non-uniformity can be prevented. FIG. 8 shows waveforms of a scanning signal voltage supplied from the first scanning lines 1g when the line inversion driving or the dot inversion driving is performed in the liquid crystal display device 100A. FIG. 8 shows the timing at which a gate ON voltage is input from the signal lines g1 to the first TFTs 12a. FIG. 8 shows the waveforms of the scanning signal voltage supplied from the first scanning lines g1 of the first through sixth pixel rows and the (N−5)th through N'th pixel rows (final pixel row) as examples.

As shown in FIG. 8, in the liquid crystal display device 100A, first, in a first half T1a of the first period T1, a gate ON voltage is input from the first scanning lines g1 to the first TFTs 12a in the order of the first pixel row, the third pixel row, the fifth pixel row, . . . the (N−5)th pixel row, the (N−3)th pixel row and the (N−1)th pixel row. Thus, the first TFTs 12a are turned ON. As a result, a display signal voltage is supplied to the temporary storage capacitors $C_T$ in every other pixel row from the first signal lines s1.

Then, in a second half T1b of the first period T1, a gate ON voltage is input from the first scanning lines g1 to the first TFTs 12a in the order of the second pixel row, the fourth pixel row, the sixth pixel row, . . . the (N−4)th pixel row, the (N−2)th pixel row and the N'th pixel row. Thus, the first TFTs 12a are turned ON. As a result, a display signal voltage is supplied from the first signal lines s1 to the temporary storage capacitors $C_T$ in every other pixel row.

Then, like in the liquid crystal display device 100, driving in the second period T2 and the driving in the third period T3 are performed. Namely, in the second period T2, a gate ON voltage is input from the third scanning lines g3 of all the pixel rows to the third TFTs 12c, and thus the third TFTs 12c in all the pixels 1 are turned ON. As a result, a reset voltage is supplied from the signal lines s2 to the pixel capacitors $C_{Pix}$ in all the pixels 1. Then, in the third period T3, a gate ON voltage is input from the second scanning lines g2 of all the pixel rows to the second TFTs 12b, and thus the second TFTs 12b in all the pixels 1 are turned ON. As a result, the voltage stored in the temporary storage capacitors $C_T$ is written to the pixel capacitors $C_{Pix}$ in all the pixels 1 globally.

As described above, in the liquid crystal display device 100A, in each of the first half T1a and the second half T1b of the first period T1, a display signal voltage is supplied from the first signal lines s1 to the temporary storage capacitors $C_T$ in every other pixel row. Therefore, when the line inversion driving or the dot inversion driving is performed, it is not necessary to invert the polarity of the voltage supplied from a signal line driving circuit (not shown) to the first signal lines s1 in every other horizontal scanning period. Namely, in the first half T1a of the first period T1, a voltage of one polarity ("first polarity") can be kept supplied from the signal line driving circuit (source driver) to the first signal lines s1; and then, in the second half T1b of the first period T1, a voltage of the opposite polarity ("second polarity") can be kept supplied. Therefore, a voltage can be supplied sufficiently from the signal line driving circuit to the first signal lines s1, and thus a voltage can also be supplied sufficiently from the first signal lines s1 to the temporary storage capacitors $C_T$.

Figure 9:
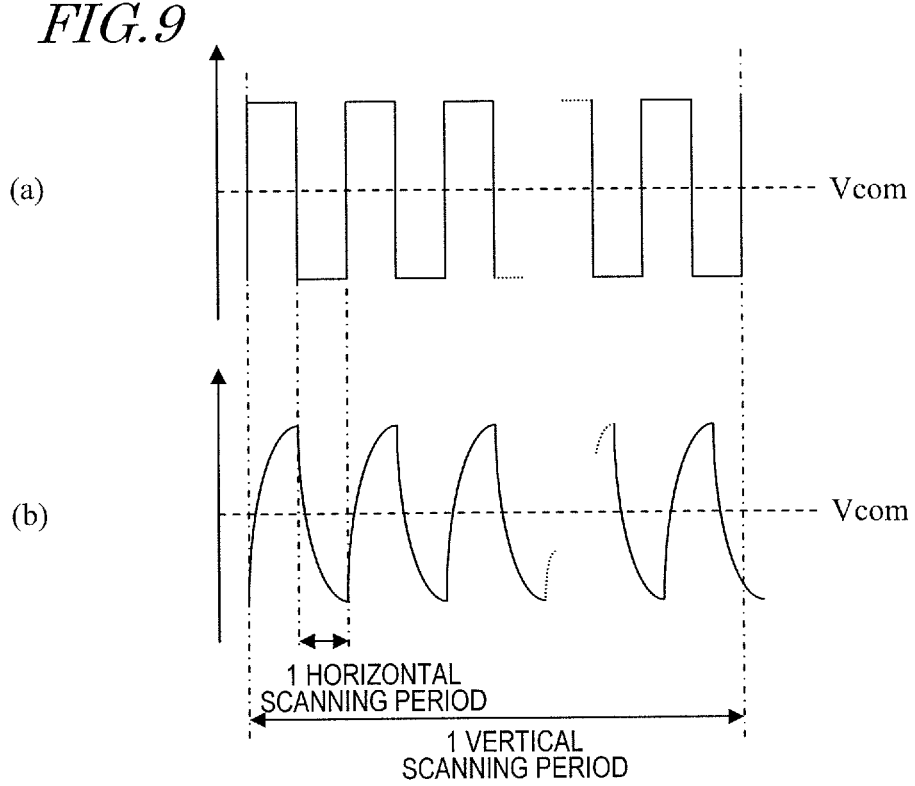
FIGS. 9(a) and 9(b) each show a waveform of a voltage supplied from a signal line driving circuit to a signal line 700s, and the potentials of the signal line 700s supplied with the voltage, for providing plain white display by a conventional liquid crystal display device 700 driven by the dot inversion driving.
Figure 10:
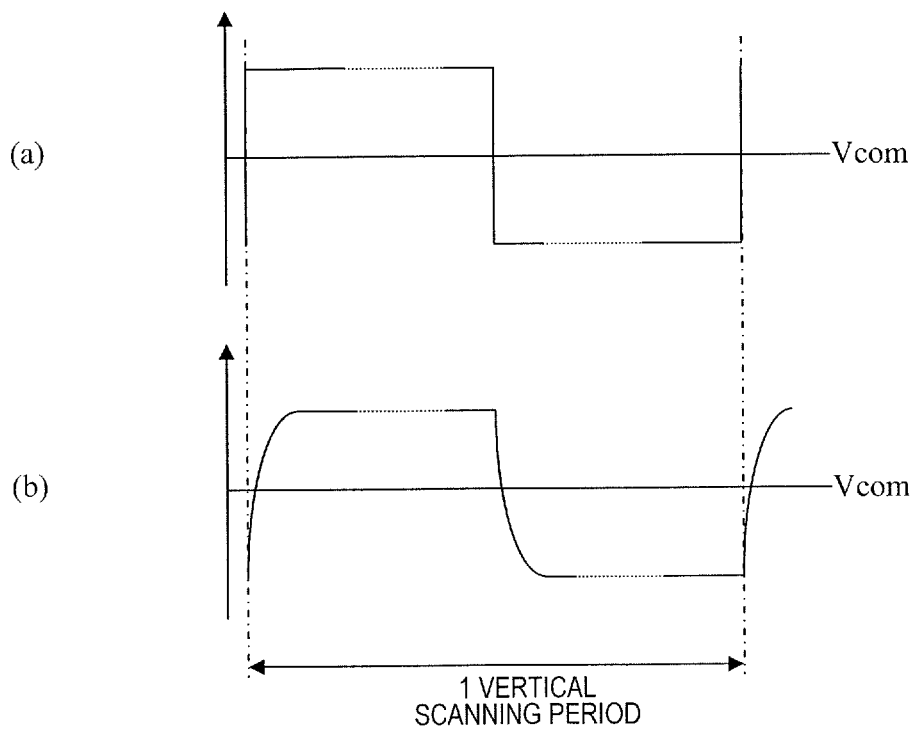
FIGS. 10(a) and 10(b) each show a waveform of a voltage supplied from the signal line driving circuit to a first signal line s1, and the potentials of the first signal line s1 supplied with the voltage, for providing plain white display by the liquid crystal display device 100A.

FIGS. 9(a) and 9(b) each show a waveform of a voltage supplied from the signal line driving circuit to a signal line 700s, and the potentials of the signal line 700s supplied with the voltage, for providing plain white display (display which is uniformly white on the entire screen) by the conventional liquid crystal display device 700 driven by the dot inversion driving. FIGS. 10(a) and 10(b) each show a waveform of a voltage supplied from the signal line driving circuit to the first signal line s1 (first signal line s1 of odd number pixel columns, in the vertical scanning period in which the voltages of the polarities shown in FIG. 7 are applied), and the potentials of the first signal line s1 supplied with the voltage, for providing plain white display by the liquid crystal display device 100A.

In the conventional liquid crystal display device 700, data is written to the pixel capacitors in a line sequential manner. Therefore, in order to perform the dot inversion driving, it is necessary to, as shown in FIG. 9(a), supply a positive (with respect to the common voltage Vcom supplied to the counter electrode) voltage from the signal line driving circuit to the signal line 700s in one horizontal scanning period, then supply a negative voltage to the next horizontal scanning period, and then supply a positive voltage to the still next horizontal scanning period. Therefore, the level of the voltage needs to be changed significantly (e.g., from about +15 V to 0 V) within a short time period (in the case of the full HD at 60 Hz, one horizontal scanning period is about 13 μs). Thus, in the case of a large screen (e.g., of 40 inches or larger), as shown in FIG. 9(b), the potential of the signal line 700s does not reach a desired level within one horizontal scanning period. As a result, the voltage written to the pixel capacitors is insufficient (insufficient charge).

By contrast, in the liquid crystal display device 100A, even when the dot inversion driving is performed, as shown in FIG. 10(a), a positive voltage can be kept supplied from the signal line driving circuit to the first signal line s1 for about half of one vertical scanning period (more precisely, for the first half T1a of the first period T1), and a negative voltage can be kept supplied for about another half of the one vertical scanning period (more precisely, for the second half T1b of the first period T1). Therefore, it is not necessary to change the level of the voltage significantly within a short time period. Thus, as shown in FIG. 10(b), the potential of the first signal line s1 is at a desired level in most of one vertical scanning period (most of the first period T1). For this reason, the voltage written to the pixel capacitors is prevented from being insufficient (insufficient charge is prevented).

FIG. 11(a) shows plain white display provided on the conventional liquid crystal display device 700 driven by dot inversion driving. FIG. 11(b) shows plain white display provided by the liquid crystal display device 100A in this embodiment. In the conventional liquid crystal display device 700, the insufficient charge occurs as described above. As a result, as shown in FIG. 11(a), the luminance is decreased in a lower area of the screen (opposite to the signal line driving circuit), and thus luminance non-uniformity occurs. By contrast, in the liquid crystal display device 100A, the insufficient charge does not occur. For this reason, as shown in FIG. 11(b), the luminance is almost uniform in the entire screen, and thus the luminance non-uniformity is alleviated.

In this embodiment, the order in which a voltage is supplied to the temporary storage capacitors $C_T$ in each pixel row in the first period T1 (timing at which a gate ON voltage is input from the first scanning lines g1 to the first TFTs 12a) is made different from the order in which simple line sequential scanning is performed (input timing). Such an arrangement can be adopted for the following reason. In the liquid crystal display device 100A, pixel data is written globally in the third period T3. Therefore, in whichever order the voltage supply may be performed to the temporary storage capacitors $C_T$ in the first period T1 (e.g., even when the voltage supply is performed in such an order that a voltage is supplied sufficiently to the first signal lines s1 as described above), display is not adversely influenced.

Figure 12:
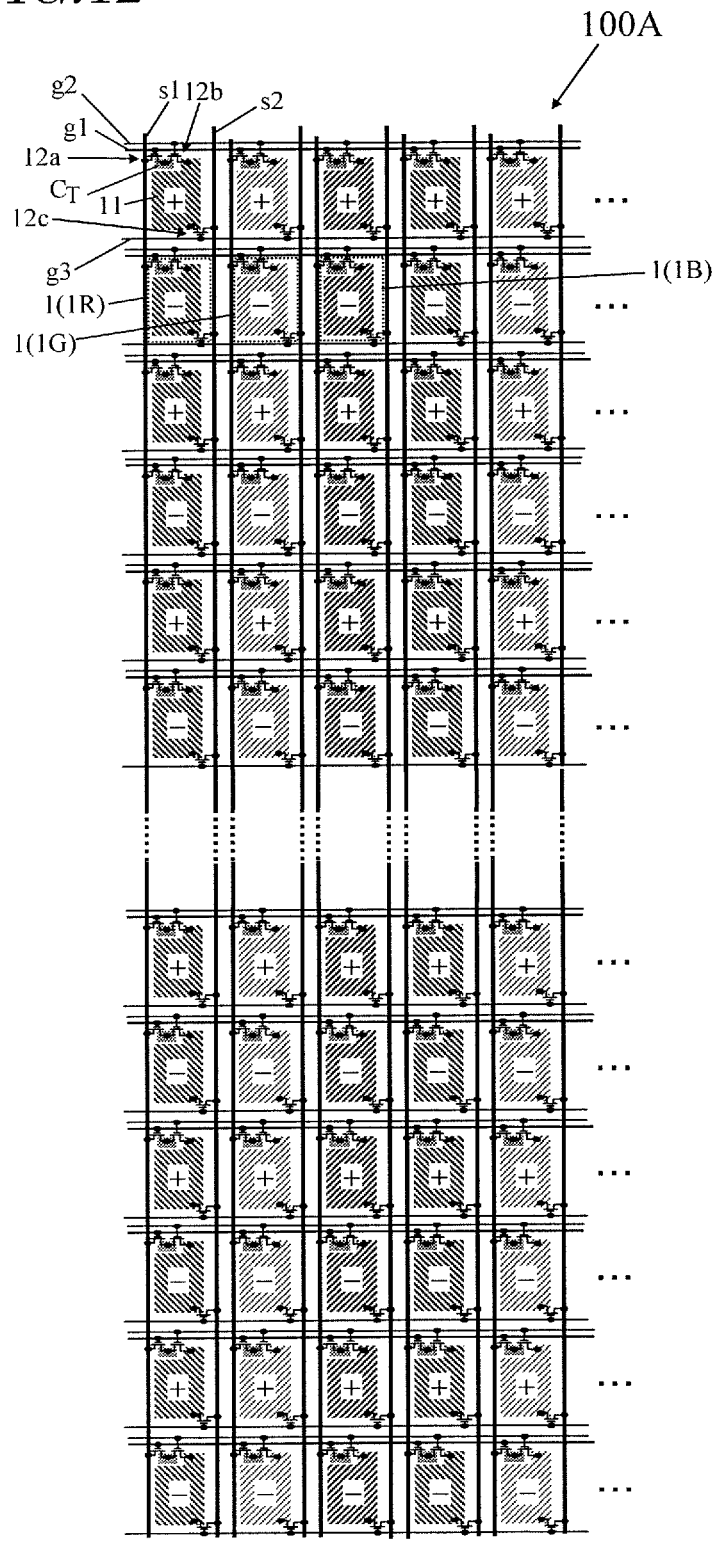
FIG. 12 is a plan view schematically showing the liquid crystal display device 100A in a preferable embodiment according to the present invention.

FIG. 7 shows the polarities of the voltages when the dot inversion driving is performed. Even when the line inversion driving by which the polarity of the voltage is inverted every pixel row is performed as shown in FIG. 12, substantially the same effect is provided.

In this embodiment, in each of the first half T1$a$ and the second half T1$b$ of the first period T1, the display signal voltage is supplied from the first signal lines s1 to the temporary storage capacitors $C_T$ in every other pixel row (namely, after scanning is performed for one pixel row, the next pixel row is skipped). However, the supply of the display signal voltage to the temporary storage capacitors $C_T$ does not need to be performed in this manner.

For example, in the case where two-line inversion driving by which the polarity of the applied voltage is inverted every two pixel rows (the driving by which the polarity of the applied voltage is inverted every other pixel row is occasionally referred to as "one-line inversion period") is performed, in each of the first half T1$a$ and the second half T1$b$ of the first period T1, the display signal voltage is supplied from the first signal lines s1 to the temporary storage capacitors $C_T$ in every two pixel rows (namely, after scanning is performed for two pixel rows, the next two pixel rows are skipped). Namely, in the first half T1$a$ of the first period T1, a gate ON voltage may be input from the first scanning lines g1 to the first TFTs 12$a$ in the order of the first pixel row, the second pixel row, the fifth pixel row, the sixth pixel row, . . . the (N−7)th pixel row, the (N−6)th pixel row, the (N−3)th pixel row and the (N−2)th pixel row. In the second half T1$b$ of the first period T1, a gate ON voltage may be input from the first scanning lines g1 to the first TFTs 12$a$ in the order of the third pixel row, the fourth pixel row, the seventh pixel row, the eighth pixel row, the (N−5)th pixel row, the (N−4)th pixel row, the (N−1)th pixel row and the N'th pixel row. Owing to this, the display signal voltage is supplied from the first signal lines s1 to the temporary storage capacitors $C_T$ in every two pixel rows. Therefore, luminance non-uniformity can be suppressed in the case where the two-line inversion driving is performed.

In the above description, the scanning is performed from the top to the bottom in each of the first half T1$a$ and the second half T1$b$ of the first period T1. Alternatively, the scanning may be performed from the bottom to the top. In each of the first half T1$a$ and the second half T1$b$, the order of the scanning can be optionally set.

As can be seen from the above, by a structure in which in the first half T1$a$ of the first period T1, a display signal voltage of one polarity (first polarity) is supplied from the first signal lines s1 to the temporary storage capacitors $C_T$ in a half of the plurality of pixel rows, which include the plurality of pixels 1, and in the second half T1$b$ of the first period T1, a display signal voltage of the polarity opposite to the first polarity is supplied from the first signal lines s1 to the temporary storage capacitors $C_T$ in another half of the pixel rows, the effect of preventing the luminance non-uniformity is provided.

(Embodiment 3)

Figure 13:
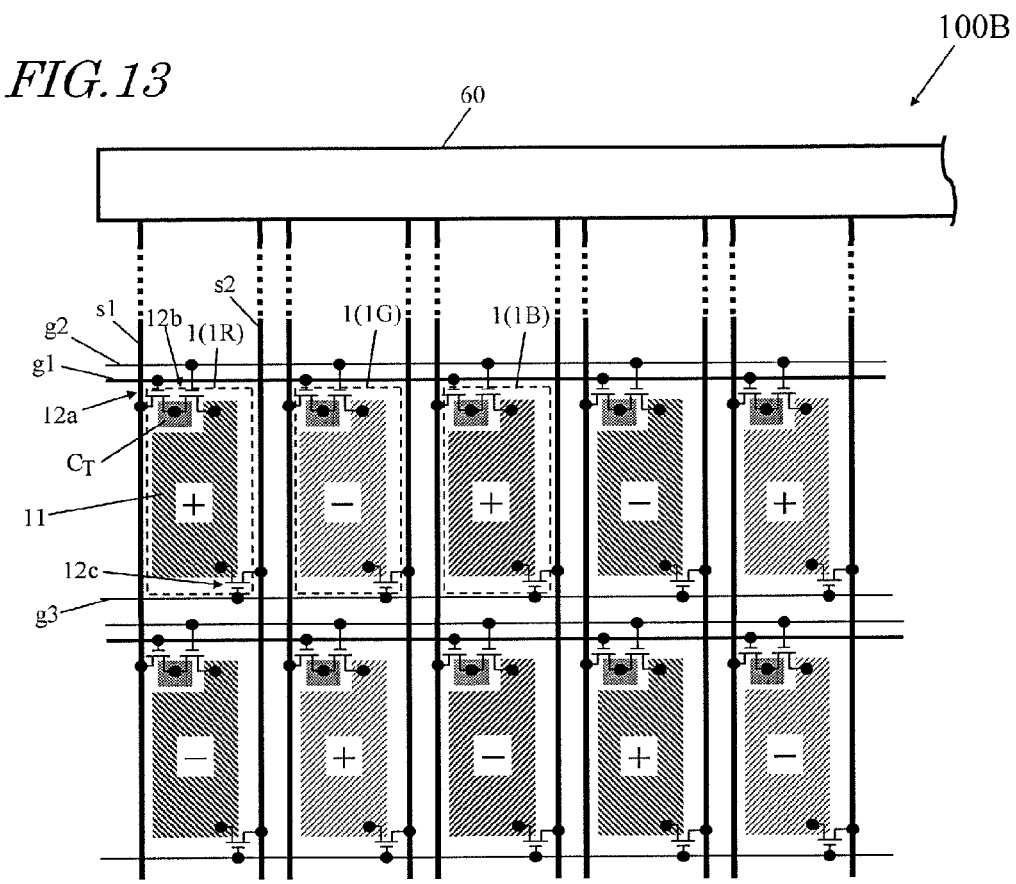
FIG. 13 is a plan view schematically showing a liquid crystal display device 100B in a preferable embodiment according to the present invention.

FIG. 13 shows a liquid crystal display device 100B in this embodiment. FIG. 13 schematically shows a planar structure of the liquid crystal display device 100B.

The liquid crystal display device 100B has the same panel structure as that of the liquid crystal display device 100 and the liquid crystal display device 100A. Namely, the liquid crystal display device 100B includes a first scanning line g1, a second scanning line g2 and a third scanning line g3 provided for each pixel row, a first signal line s1 and a second signal line s2 provided for each pixel column, and a temporary storage capacitance $C_T$ provided for each pixel 1. The liquid crystal display device 100B further includes a first TFT 12$a$, a second TFT 12$b$ and a third TFT 12$c$ provided for each pixel 1. FIG. 13 shows a signal line driving circuit (source driver) 60 included in the liquid crystal display device 100B. The signal line driving circuit 60 supplies a voltage to the first signal lines s1 and the second signal lines s2.

The liquid crystal display device 100B in this embodiment has a feature in the form of supplying a voltage from the signal line driving circuit 60 to each first signal line s1 and each second signal line s2. In the liquid crystal display device 100B, the voltage supplied from the signal line driving circuit 60 to the first signal line s1 and the voltage supplied from the signal line driving circuit 60 to the second signal line s2 in the first period T1 have substantially the same level as each other in opposite polarities from each other with respect to the voltage supplied to the counter electrode 21.

Figure 14:
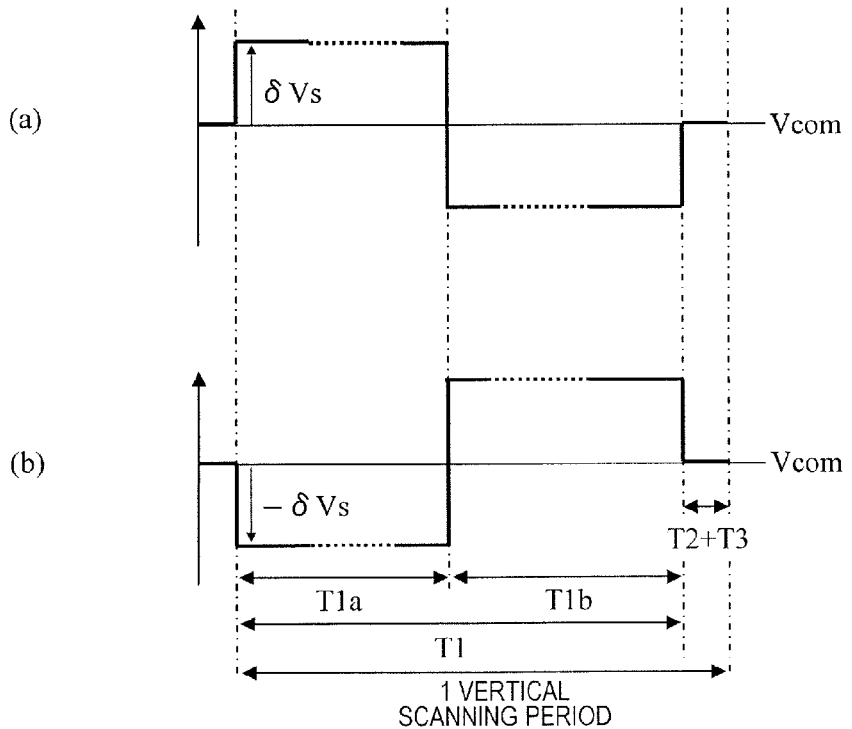
FIGS. 14(a) and 14(b) show waveforms of voltages supplied from a signal line driving circuit 60 to the first signal line s1 and the second signal line s2 for providing plain white display by the liquid crystal display device 100B.

FIGS. 14($a$) and 14($b$) show waveforms of a voltage supplied from the signal line driving circuit 60 to the first signal line s1 and the voltage supplied from the signal line driving circuit 60 to the second signal line s2 for providing plain white display by the liquid crystal display device 100B.

In the example shown in FIG. 14($a$), the first signal line s1 is supplied with a positive voltage in the first half T1$a$ of the first period T1 and is supplied with a negative voltage in the second half T1$b$ of the first period T1. In the second period T2 and the third period T3, the first signal line s1 is supplied with a voltage of the same level as that of the common voltage Vcom supplied to the counter electrode 21.

As shown in FIG. 14($b$), the second signal line s2 is supplied with a negative voltage in the first half T1$a$ of the first period T1 and is supplied with a positive voltage in the second half T1$b$ of the first period T1. In the second period T2 and the third period T3, the second signal line s2 is supplied with a voltage of the same level as that of the common voltage Vcom supplied to the counter electrode 21.

The level of fluctuation of the voltage supplied to the first signal line s1 and the level of fluctuation of the voltage supplied to the second signal line s2 are substantially the same as each other. Namely, where the voltage fluctuation in the first signal line s1 is represented as δVs, the voltage fluctuation in the second signal line s2 is represented as −δVs.

As can be seen, the voltage supplied from the signal line driving circuit 60 to the first signal line s1 and the voltage supplied from the signal line driving circuit 60 to the second signal line s2 in the first period T1 have substantially the same level as each other in opposite polarities from each other with respect to the voltage supplied to the counter electrode 21 (Vcom).

As described above, the second signal lines s1 are for supplying a reset voltage to the pixel capacitors $C_{Pix}$ in the second period T2. Therefore, it is conceivable to supply a voltage from the signal line driving circuit 60 to the first signal line s1 and to the second signal line s2 as shown in FIGS. 15($a$) and 15($b$).

Figure 15:
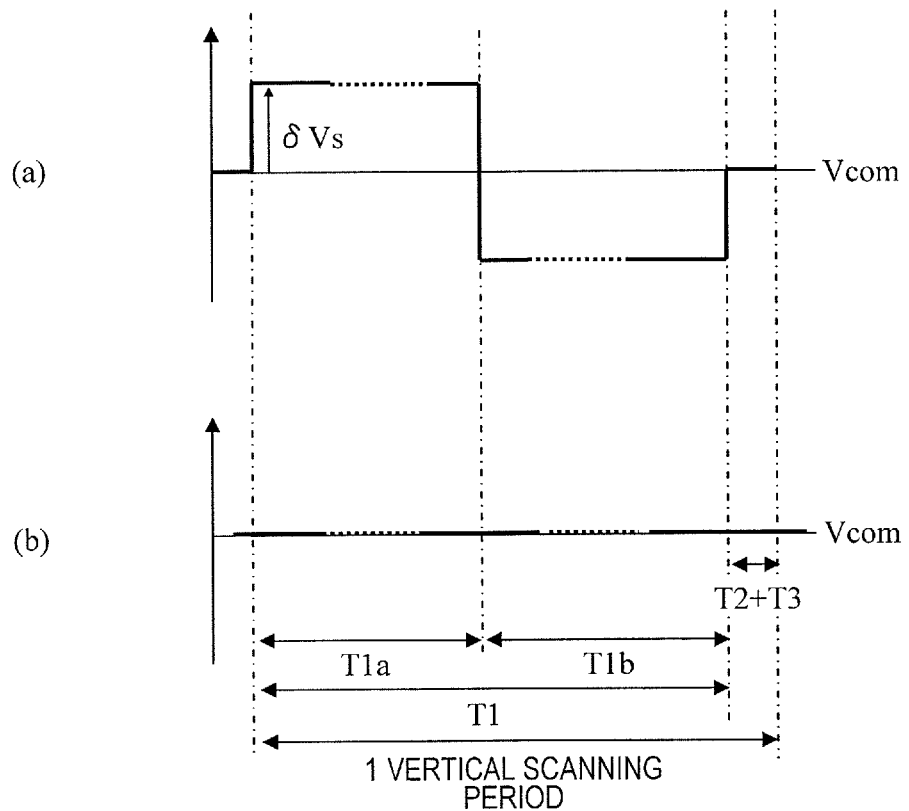
FIGS. 15(a) and 15(b) show another example of waveforms of voltages supplied from the signal line driving circuit 60 to the first signal line s1 and the second signal line s2 for providing plain white display by the liquid crystal display device 100B.

The voltage waveform shown in FIG. 15($a$) (waveform of the voltage supplied to the first signal line s1) is the same as the voltage waveform shown in FIG. 14($a$). By contrast, the voltage waveform shown in FIG. 15($b$) (waveform of the voltage supplied to the second signal line s2) is different from the voltage waveform shown in FIG. 15($a$). In the example shown in FIG. 15($b$), the second signal line s2 is supplied with a voltage of the same level as that of the common voltage (Vcom) in all the periods, namely, the first half T1$a$ and the second half T1$b$ of the first period T1, the second period T2 and the third period T3 (namely, throughout one vertical scanning period).

Even when the second signal line s2 is supplied with the voltage as shown in FIG. 15($b$), the pixel data erasure in the second period T2 and the global pixel data write in the third period T3 can be performed with no problem. However, in this case, in the first period T1, the potential of the pixel electrode 11 fluctuates along with the voltage fluctuation of the first signal line s1. By contrast, when the second signal line s2 is supplied with the voltage as shown in FIG. 14(b), such potential fluctuation of the pixel electrode 11 can be prevented.

Figure 16:
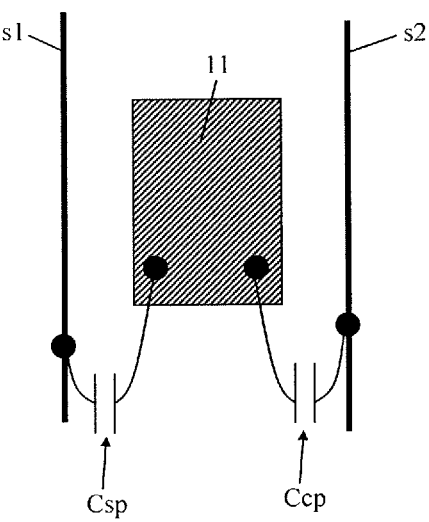
FIG. 16 schematically shows a first signal line-pixel electrode capacitance Csp and a second signal line-pixel electrode capacitance Ccp.
Figure 17:
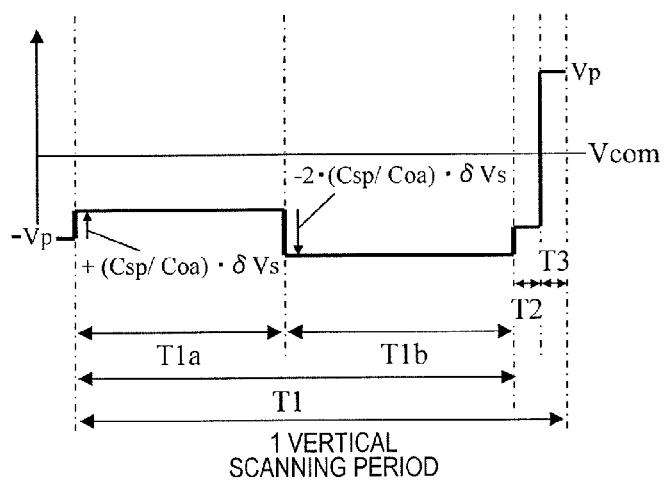
FIG. 17 shows the potential of a pixel electrode 11 when the voltage supply shown in FIG. 14(b) is performed.

An insulating body (dielectric body) is present between each first signal line s1 and the corresponding pixel electrode 11, and the first signal line s1 and the pixel electrode 11 are close to each other. Therefore, as schematically shown in FIG. 16, the first signal line s1 and the pixel electrode 11 are electrically coupled to each other via a capacitance (first signal line-pixel electrode capacitance) Csp. Thus, when the voltage is supplied as shown in FIG. 15(b), the potential of the pixel electrode 11 fluctuates as shown in FIG. 17 in the first period T1 (i.e., period in which display is provided based on the immediately previous pixel data).

For example, where the voltage written to the pixel electrode 11 in the immediately previous scanning period (i.e., potential of the pixel electrode 11 based on the immediately previous pixel data) is $-Vp$ and the capacitance value of all the capacitances parasitic in the pixel 1 is Coa', potential $V_1$ of the pixel electrode 11 after the voltage in the first signal line s1 fluctuates is represented by the following expression (1). In expression (1), $\delta Vs$ is the voltage fluctuation in the first signal line s1 (see FIG. 15(a)), and Csp' is the capacitance value of the first signal line-pixel electrode capacitance Csp.

$$V_1 = -Vp + (Csp'/Coa') \cdot \delta Vs \tag{1}$$

As can be seen, when the potential of the pixel electrode 11 fluctuates along with the voltage fluctuation of the first signal line s1, the transmittance of the pixel 1 is changed. Therefore, a desired display luminance cannot be obtained, and the display quality is declined.

In the meantime, an insulating body (dielectric body) is present also between each second signal line s2 and the corresponding pixel electrode 11, and the second signal line s2 and the pixel electrode 11 are close to each other.

Therefore, as schematically shown in FIG. 16, the pixel electrode 11 is electrically coupled also to the second signal line s2 via a capacitance (second signal line-pixel electrode capacitance) Ccp. Thus, where the voltage fluctuation in the second signal line s2 is $-\delta Vs$ as shown in FIG. 14(b), potential $V_2$ of the pixel electrode 11 after the voltage in the first signal line s1 fluctuates is represented by the following expression (2). In expression (2), Ccp' is the capacitance value of the second signal line-pixel electrode capacitance Ccp.

$$V2 = -Vp + (Csp'/Coa') \cdot \delta Vs - (Ccp'/Coa') \cdot \delta Vs \tag{2}$$

Where the capacitance value Csp' of the first signal line-pixel electrode capacitance Csp is approximately equal to the capacitance value Ccp' of the second signal line-pixel electrode capacitance Ccp (i.e., Csp'≈Ccp'), the following expression (2)' is obtained from expression (2).

$$V2 \approx -V \tag{2'}$$

Figure 18:
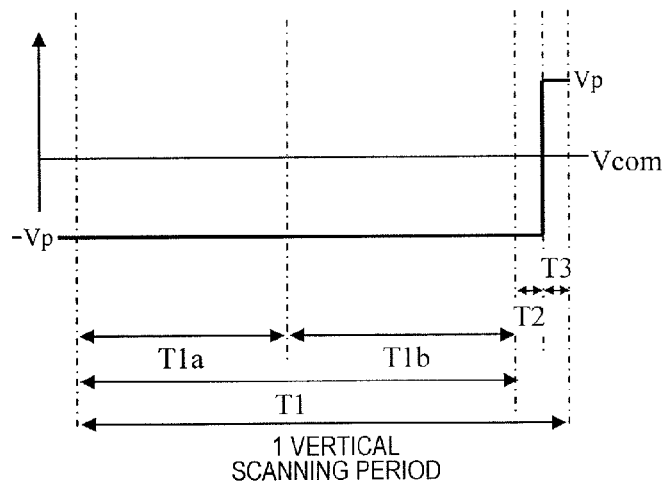
FIG. 18 shows the potential of the pixel electrode 11 when the voltage supply shown in FIG. 15(b) is performed.

As can be seen from expression (2)', potential $V_2$ of the pixel electrode 11 after the voltage of the first signal line s1 fluctuates is not changed almost at all from the potential $-Vp$ of the pixel electrode 11 based on the immediately previous pixel data. Therefore, when the voltage is supplied as shown in FIG. 14(b), the potential of the pixel electrode 11 does not fluctuate in the first period T1 as shown in FIG. 18.

As can be seen, when the first signal line s1 and the second signal line s2 are supplied with voltages having substantially the same level as each other in opposite polarities from the signal line driving circuit 60 in the first period T1, the potential fluctuation in the pixel electrode 11 caused by the capacitance coupling between the first signal line s1 and the pixel electrode 11 can be counteracted by the potential fluctuation caused by the capacitance coupling between the second signal line s2 and the pixel electrode 11. Therefore, the change in the transmittance in the pixel 1 can be prevented in the first period T1, and thus higher quality display can be realized.

(Embodiment 4)

Figure 19:
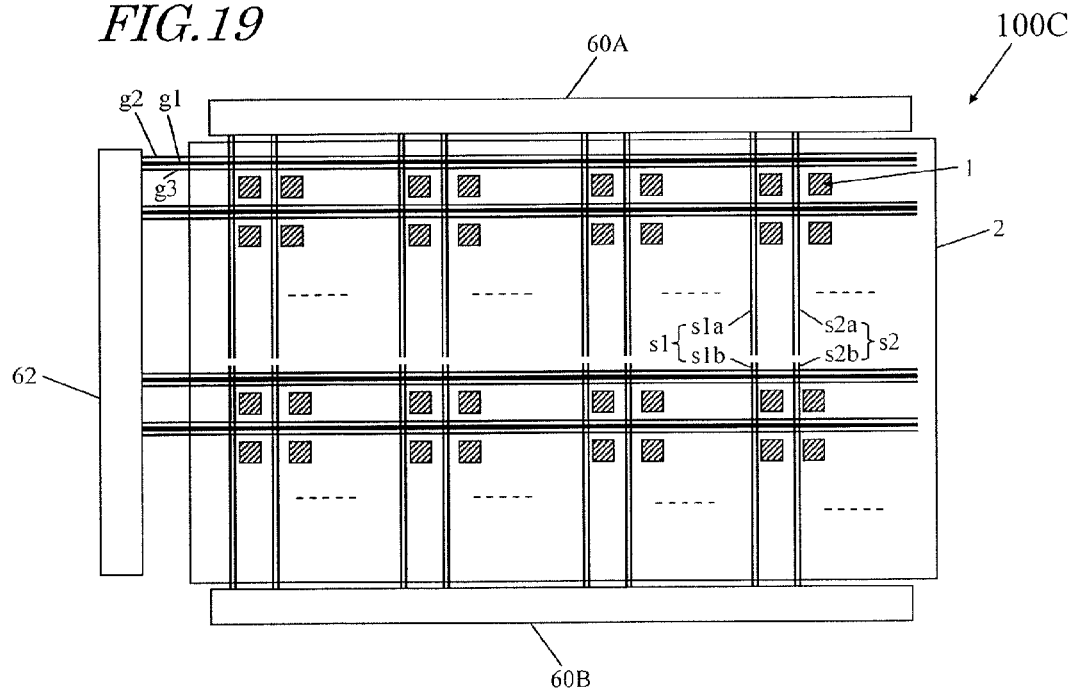
FIG. 19 is a plan view schematically showing a liquid crystal display device 100C in a preferable embodiment according to the present invention.

FIG. 19 shows a liquid crystal display device 100C in this embodiment. FIG. 19 schematically shows a planar structure of the liquid crystal display device 100C.

Unlike in the liquid crystal display device 100 in Embodiment 1, in liquid crystal display device 100C, as shown in FIG. 19, the first signal line s1 and the second signal line s2 are respectively divided into first parts (upper parts) s1a and s2a located in a relatively upper area in the column direction and second parts (lower parts) s1b and s2b located in a relatively lower area in the column direction.

The liquid crystal display device 100C includes a liquid crystal panel 2 including a plurality of pixels 1, a scanning driving circuit (gate driver) 62, and signal line driving circuits (source drivers) 60A and 60B. The first scanning lines g1, the second scanning lines g2 and the third scanning lines g3 are each supplied with a voltage from the scanning line driving circuit 62. The first parts s1a and s2a of the first signal lines s1 and the second signal lines s2 are each supplied with a voltage from the signal line driving circuit 60A provided in the upper area of the liquid crystal panel 2. The second parts s1b and s2b of the first signal lines s1 and the second signal lines s2 are each supplied with a voltage from the signal line driving circuit 60B provided in the lower area of the liquid crystal panel 2.

As can be seen, in the liquid crystal display device 100C, the first signal lines s1 and the second signal lines s2 are respectively divided into the upper parts s1a and s2a and the lower parts s1b and s2b. It can be considered that the liquid crystal panel 2 is divided into the upper and lower areas (from the viewpoint of driving the first signal lines s1 and the second signal lines s2).

It is conventionally known that there is a problem that the pixel capacitor is insufficiently charged due to an increase in the capacitance of the signal line, which is caused by enlargement of the liquid crystal panel. In order to solve this problem, the following method for driving the liquid crystal panel has been proposed. The liquid crystal panel is divided into an upper area and a lower area, and one signal line driving circuit is provided for the upper area of the liquid crystal panel and another signal line driving circuit is provided for the lower area of the liquid crystal panel. Thus, the upper area and the lower area of the liquid crystal panel are driven by the different signal line driving circuits.

However, when such a structure is adopted to a conventional liquid crystal display device, the following problem may occur when a video showing motions is displayed.

Figure 20:
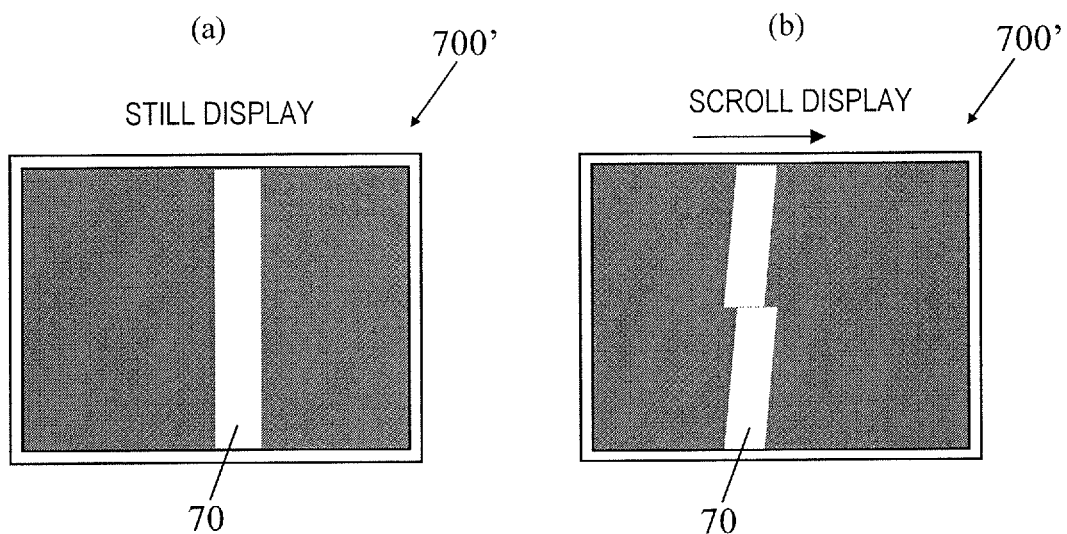
FIG. 20(a) shows the vertical bar 70 displayed in a still manner on a screen of a liquid crystal display device 700' obtained by modifying the conventional liquid crystal display device 700 such that the liquid crystal display device 700 has an upper area and a lower area separated from each other.
FIG. 20(b) shows the vertical bar 70 displayed in a scroll manner so as to move rightward on the screen of the liquid crystal display device 700'.

FIG. 20(a) shows the vertical bar 70 displayed in a still manner on a screen of a liquid crystal display device 700' obtained by modifying the conventional liquid crystal display device 700 such that the liquid crystal display device 700 has an upper area and a lower area separated from each other. FIG. 20(b) shows the vertical bar 70 displayed in a scroll manner so as to move rightward on the screen of the liquid crystal display device 700'. In the case of the still display, as shown in FIG. 20(a), the vertical bar 70 is displayed parallel to the top-bottom direction, namely, normally. By contrast, in the case of the scroll display, as shown in FIG. 20(b), the vertical bar 70 is displayed as being inclined with respect to the top-bottom direction, and an upper part and a lower part of the vertical bar 70 are shifted in the left-right direction.

Figure 21:
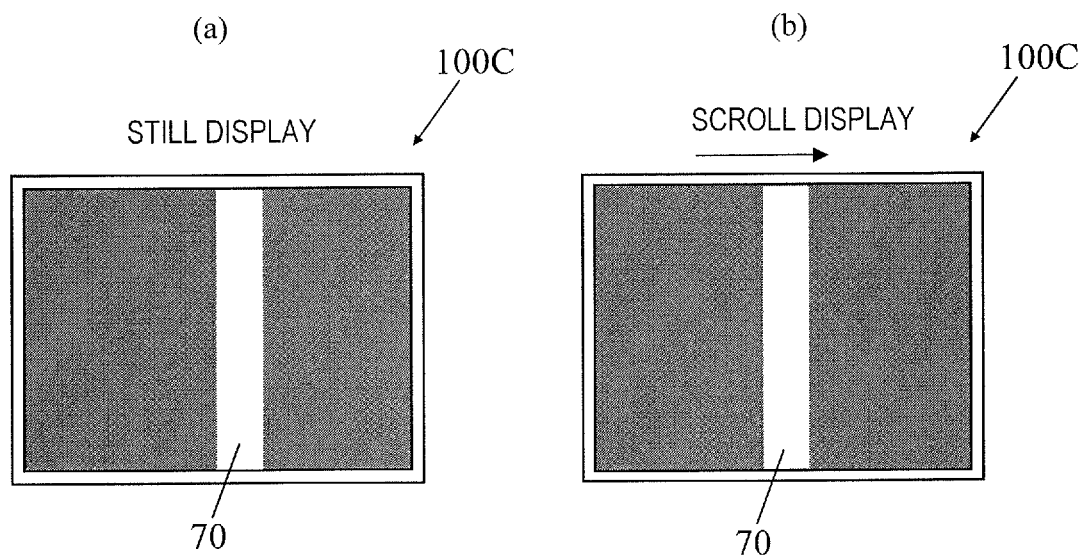
FIG. 21(a) shows the vertical bar 70 displayed in a still manner on a screen of a liquid crystal display device 100C.
FIG. 21(b) shows the vertical bar 70 displayed in a scroll manner so as to move rightward on the screen of the liquid crystal display device 100C.

FIG. 21(a) shows the vertical bar 70 displayed in a still manner on a screen of the liquid crystal display device 100C, and FIG. 21(b) shows the vertical bar 70 displayed in a scroll manner so as to move rightward on the screen of the liquid crystal display device 100C. In the case of the still display, as shown in FIG. 21(a), the vertical bar 70 is displayed parallel to the top-bottom direction, namely, normally. In the case of the scroll display also, as shown in FIG. 21(b), the vertical bar 70 is displayed normally. Namely, the vertical bar 70 is not displayed as being inclined with respect to the top-bottom direction, and the upper part and the lower part of the vertical bar 70 are not shifted in the left-right direction.

As can be seen, the liquid crystal display device 100C can display a video showing motions with no problem despite that the liquid crystal panel 2 is divided into the upper area and the lower area. In addition, since the liquid crystal panel 2 of the liquid crystal display device 100C is divided into the upper area and the lower area, insufficient charge to the pixel capacitor $C_{Pix}$ is not likely to occur even when the screen of the liquid crystal panel 2 is enlarged.

(Embodiment 5)

Figure 22:
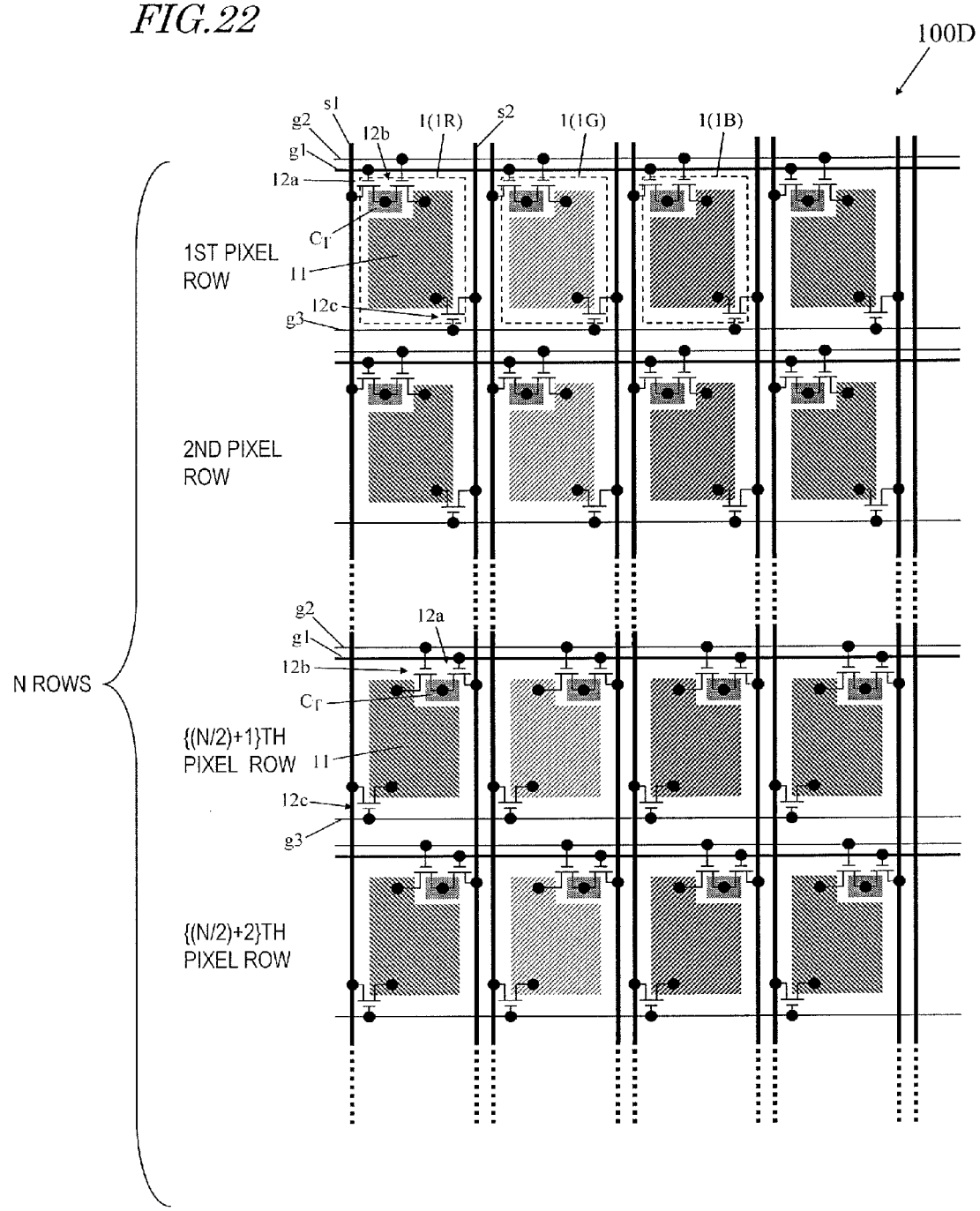
FIG. 22 is a plan view schematically showing a liquid crystal display device 100D in a preferable embodiment according to the present invention.

FIG. 22 shows a liquid crystal display device 100D in this embodiment. FIG. 22 schematically shows a planar structure of the liquid crystal display device 100D.

Like the liquid crystal display device 100, the liquid crystal display device 100D includes a first scanning line g1, a second scanning line g2 and a third scanning line g3 provided for each pixel row, a first signal line s1 and a second signal line s2 provided for each pixel column, and a temporary storage capacitor $C_T$ provided for each pixel 1. Like the liquid crystal display device 100, the liquid crystal display device 100D includes a first TFT 12a, a second TFT 12b and a third TFT 12c provided for each pixel 1.

In the liquid crystal display device 100D in this embodiment, the target of control by the first TFT 12a and the third TFT 12c regarding electrical connection is different between a part of the pixel rows each including a plurality of pixels 1 and in the rest of the pixel rows. Namely, the pixels 1 in which each of the first TFT 12a and the third TFT 12c is electrically connected to a certain type component, and pixels 1 in which each of the first TFT 12a and the third TFT 12c is electrically connected to another type component, are located in a mixed state.

In the example shown in FIG. 22, there are a total of N pixel rows. In each of the pixels 1 in an upper half of the pixel rows (i.e., first pixel row through (N/2)th pixel row), the source electrode of the first TFT 12a is electrically connected to the first signal line s1, and the drain electrode of the first TFT 12a is electrically connected to the first electrode E1 of the temporary storage capacitor $C_T$. Therefore, the first TFT (first switching element) 12a, which is to be turned ON/OFF by a scanning signal voltage supplied from the first signal line g1, controls the electrical connection between the first signal line s1 and the temporary storage capacitor $C_T$. The source electrode of the third TFT 12c is electrically connected to the second signal line s2, and the drain electrode of the third TFT 12c is electrically connected to the pixel electrode 11. Therefore, the third TFT (third switching element) 12c controls the electrical connection between the second signal line s2 and the pixel capacitor $C_{Pix}$.

As can be seen, in each of the pixels 1 in the upper half of pixel rows, the electrical connection between the first signal line s1 and the temporary storage capacitor $C_T$ is controlled by the first TFT 12a, and the electrical connection between the second signal line s2 and the pixel capacitor $C_{Pix}$ is controlled by the third TFT 12c, like in the liquid crystal display device 100.

In each of the pixels 1 in the lower half of pixel rows (i.e., {(N/2)+1}th pixel through N'th pixel), the source electrode of the first TFT 12a is electrically connected to the second signal line s2, and the drain electrode of the first TFT 12a is electrically connected to the first electrode E1 of the temporary storage capacitor $C_T$. Therefore, the first TFT 12a controls the electrical connection between the second signal line s2 and the temporary storage capacitor $C_T$. The source electrode of the third TFT 12c is electrically connected to the first signal line s1, and the drain electrode of the third TFT 12c is electrically connected to the pixel electrode 11. Therefore, the third TFT 12c controls the electrical connection between the first signal line s1 and the pixel capacitor $C_{Pix}$.

As can be seen, in each of the pixels 1 in the lower half of pixel rows, the electrical connection between the second signal line s2 and the temporary storage capacitor $C_T$ is controlled by the first TFT 12a, and the electrical connection between the first signal line s1 and the pixel capacitor $C_{Pix}$ is controlled by the third TFT 12c, unlike in the liquid crystal display device 100.

Figure 23:
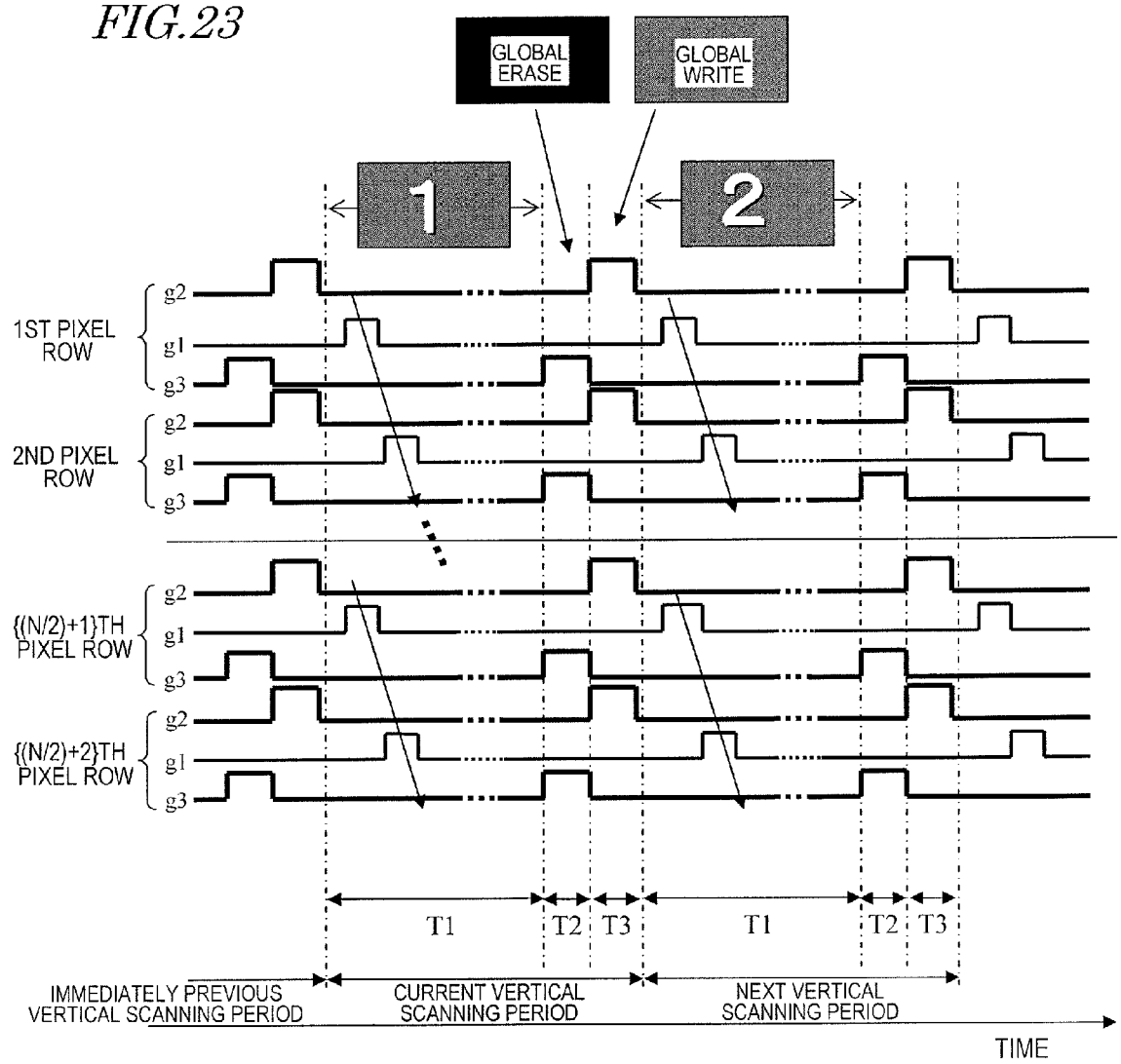
FIG. 23 shows waveforms of scanning signal voltages supplied from the first scanning lines g1, the second scanning lines g2 and the third scanning lines g3 of the liquid crystal display device 100D.

Now, with reference to FIG. 23, a method for driving the liquid crystal display device 100D will be described. FIG. 23 shows waveforms of voltages supplied from the first scanning lines g1, the second scanning lines g2 and the third scanning lines g3. FIG. 23 shows the timing at which gate ON voltages are input to the first TFTs 12a, the second TFTs 12b and the third TFTs 12c from the first scanning lines g1, the second scanning lines g2 and the third scanning lines g3. FIG. 23 shows the waveforms of the scanning signal voltages supplied from the first scanning lines g1, the second scanning lines g2 and the third scanning lines g3 of the first pixel row, the second pixel row, the {(N/2)+1}th pixel row and the {(N/2)+2}th pixel row as examples.

First in the first period T1, in the upper half of pixel rows, a gate ON voltage is input from the first scanning lines g1 to the first TFTs 12a sequentially from the first pixel row. Thus, the first TFTs 12a are turned ON on a pixel row-by-pixel row basis. As a result, a display signal voltage is supplied from the first signal lines s1 to the temporary storage capacitors $C_T$ on a pixel row-by-pixel row basis. Also in the first period T1, in the lower half of pixel rows, a gate ON voltage is input from the first scanning lines g1 to the first TFTs 12a sequentially from the {(N/2)+1}th pixel row. Thus, the first TFTs 12a are turned ON on a pixel row-by-pixel row basis. As a result, a display signal voltage is supplied from the second signal lines s2 (not from the first signal lines s1) to the temporary storage capacitors $C_T$ on a pixel row-by-pixel row basis. As can be seen, in the first period T1, voltage supply to, and accumulation in, the temporary storage capacitors $C_T$ in each pixel row is performed in a line sequential manner in the upper half of pixel rows and the lower half of pixel rows in parallel.

Next, in the second period T2 (naturally, after the display signal voltage is supplied to the temporary storage capacitors $C_T$ in all the pixels 1), a gate ON voltage is input from the third scanning lines g3 of all the pixel rows to the third TFTs 12c. Thus, the third TFTs 12c in all the pixels 1 are turned ON. As a result, a reset voltage is supplied from the first signal lines s1 or the second signal lines s2 to the pixel capacitors $C_{Pix}$ in all the pixels 1. This will be described specifically. In each of the pixels 1 in the upper half of pixel rows, the source electrode of the third TFT 12c is electrically connected to the second signal line s2. Therefore, a reset voltage is supplied from the second signal line s2 to the pixel capacitor $C_{Pix}$. By contrast, in each of the pixels 1 in the lower half of pixel rows, the source electrode of the third TFT 12c is electrically connected to the first signal line s1. Therefore, a reset voltage is supplied from the first signal line s1 to the pixel capacitor $C_{Pix}$. The reset voltage resets the voltage written to the pixel capacitor $C_{Pix}$ in the immediately previous vertical scanning period.

Next, in the third period T3, a gate ON voltage is input from the second scanning lines g2 of all the pixel rows to the second TFTs 12b. Thus, the second TFTs 12b in all the pixels 1 are turned ON. As a result, the voltage stored in the temporary storage capacitors $C_T$ is written to the pixel capacitors $C_{Pix}$ in all the pixels 1 globally.

As described above, also in the liquid crystal display device 100D in this embodiment, a voltage can be written to the pixel capacitors $C_{Pix}$ in all the pixels 1 globally in a certain period (third period T3) of one vertical scanning period. Therefore, the liquid crystal display device 100D can display a video showing motions with no problem when being used independently or in a multi-display system. In the liquid crystal display device 100D in this embodiment, before the voltage is written to the pixel capacitors $C_{Pix}$ (in the second period T2), the voltage written to the pixel capacitors $C_{Pix}$ in the immediately previous vertical scanning period can be reset. Therefore, in the liquid crystal display device 100D, a desired voltage can be written to the pixel capacitors $C_{Pix}$ with no consideration of the level of the voltage written in the immediately previous vertical scanning period. Thus, the circuit configuration is not made complicated due to the need to consider the level of the voltage written in the immediately previous vertical scanning period, or the production cost is not raised either. As described above, the liquid crystal display device 100D can write a desired voltage to all the pixels 1 globally with a simple structure.

In addition, in the liquid crystal display device 100D, in a part of pixel rows among the plurality of pixel rows, the first signal lines s1 are used for supplying a display signal voltage and the second signal lines s2 are used for supplying a reset voltage. By contrast, in the rest of pixel rows, the second signal lines s2 are used for supplying a display signal voltage and the first signal lines s1 are used for supplying a reset voltage. Therefore, the voltage supply to the temporary storage capacitors $C_T$ in the first period T1 can be performed in parallel in a part of pixel rows (herein, the upper half of pixel rows) and the rest of pixel rows (herein, the lower half of pixel rows). This can extend the period in which the voltage can be supplied to the temporary storage capacitors $C_T$ for each pixel row (namely, extend one horizontal scanning period). In the case where, for example, the number of pixel rows in which the first signal lines s1 are used for supplying the display signal voltage is equal to the number of pixel rows in which the second signal lines s2 are used for supplying the display signal voltage as in this embodiment, one horizontal scanning period can be made twice as long for all the pixel rows. Therefore, the insufficient charge which would be otherwise caused by the enlargement of the screen described in Embodiment 4 can be prevented, and thus the luminance non-uniformity (display uniformity) can be suppressed.

FIG. 24(a) shows plain white display provided by the conventional liquid crystal display device 700 having a size of 60 inches or larger. FIG. 24(b) shows plain white display provided by the liquid crystal display device 100D in this embodiment. In the conventional liquid crystal display device 700, the insufficient charge occurs due to the increase in the capacitance of the signal lines, which is caused by the enlargement of the screen. As a result, as shown in FIG. 24(a), the luminance is decreased in a lower area of the screen (opposite to the signal line driving circuit), and thus luminance non-uniformity occurs. By contrast, in the liquid crystal display device 100D, the insufficient charge does not occur. For this reason, as shown in FIG. 24(b), the luminance is almost uniform in the entire screen, and thus the luminance non-uniformity is alleviated.

In the example shown in FIG. 23, the voltage is supplied to the temporary storage capacitors $C_T$ in a line sequential manner in each of the upper half and the lower half of the liquid crystal panel. It is not necessary to supply the voltage in this order for the following reason as described above regarding the liquid crystal display device 100A in Embodiment 2. In the liquid crystal display device 100D, the pixel data is written globally in the third period T3. Therefore, in whichever order the voltage supply may be performed to the temporary storage capacitors $C_T$ in the first period T1, display is not adversely influenced. Therefore, when the line inversion driving or the dot inversion driving is performed, the voltage supply may be performed in the first period T1 in such an order that a voltage is supplied sufficiently to the first signal lines s1 and the second signal lines s2. For example, when the one-line inversion driving or the dot inversion driving is performed, in each of the upper area and the lower area of the liquid crystal panel, a voltage of one polarity (first polarity) may be supplied to odd numbers of pixel rows in the first half T1a of the first period T1, whereas a voltage of a polarity opposite to the first polarity (second polarity) may be supplied to even numbers of pixel rows in the second half T1b of the first period T1. Owing to such a manner of voltage supply, as shown in FIG. 25(a), a voltage of one polarity (herein, positive polarity) can be kept supplied from the signal line driving circuit to the first signal line s1 in the first half T1a of the first period T1, whereas a voltage of the opposite polarity (herein, negative polarity) can be kept supplied in the second half T1b of the first period T1. Similarly, as shown in FIG. 25(b), a voltage of one polarity (herein, positive polarity) can be kept supplied to the second signal line s2 in the first half T1a of the first period T1, whereas a voltage of the opposite polarity (herein, negative polarity) can be kept supplied in the second half T1b of the first period T1. Therefore, like in the liquid crystal display device 100A in Embodiment 2, the insufficient charge which would be otherwise occurred when the line inversion driving or the dot inversion driving is performed can be prevented.

The number of pixel rows in which the first signal lines s1 are used for supplying the display signal voltage does not need to be equal to the number of pixel rows in which the second signal lines s2 are used for supplying the display signal voltage. From the viewpoint of uniformly extending one horizontal scanning period for all the pixel rows, it is preferable that these numbers of pixel rows are equal to each other. Namely, it is preferable that the first signal lines s1 are used for supplying the display signal voltage in a half of the plurality of pixel rows and that second signal lines s2 are used for supplying the display signal voltage in another half of the plurality of pixel rows.

In this embodiment, the pixel rows in which the first signal lines s1 are used for supplying the display signal voltage are located together in the upper area of the liquid crystal panel, whereas the pixel rows in which the second signal lines s2 are used for supplying the display signal voltage are located together in the lower area of the liquid crystal panel. It is not necessary to adopt such an arrangement. For example, the pixel rows in which the first signal lines s1 are used for supplying the display signal voltage, and the pixel rows in which the second signal lines s2 are used for supplying the display signal voltage, may be located alternately.

(Specific Structures of the Temporary Storage Capacitor)

Figure 26:
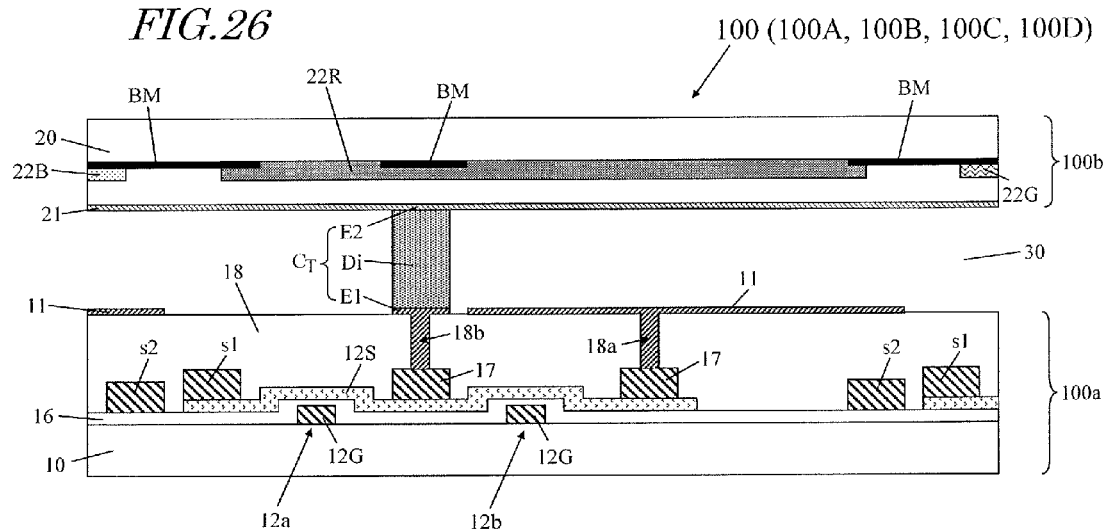
FIG. 26 shows an example of cross-sectional structure of the liquid crystal display device 100 (or any of the liquid crystal display devices 100A through 100D).

Specific examples of structure of the temporary storage capacitor $C_T$ included in the liquid crystal display devices 100, 100A, 100B, 100C and 100D in Embodiments 1 through 5 will be described. FIG. 26 shows an example of cross-sectional structure of the liquid crystal display device 100 (or one of the liquid crystal display devices 100A through 100D).

As shown in FIG. 26, the TFT substrate (active matrix substrate) 100a includes the insulating substrate 10, and the pixel electrodes 11, the first TFTs 12a, the second TFTs 12b, the first signal lines s1 and the second signal lines s2 which are located on the liquid crystal layer 30 side of the insulating substrate 10. Although not shown in FIG. 26, the TFT substrate 100a also includes the first scanning lines g1, the second scanning lines g2, the third scanning lines g3 and the third TFTs 12c.

On the insulating substrate 10, a gate insulating film 16 is formed so as to cover, for example, the gate electrodes 12G of the first, second and third TFTs 12a, 12b and 12c. On the gate insulating film 16, a semiconductor layers 12S of the first, second and third TFTs 12a, 12b and 12c, the first signal lines s1, the second signal lines s2 and the like are provided. Conductive layers 17 acting as the source electrodes and the drain electrodes of the first, second and third TFTs 12a, 12b and 12c are formed of a conductive film which is the same as that used for the first signal lines s1 and the second signal lines s2. An interlayer insulating film 18 is formed so as to cover the first signal lines s1, the second signal lines s2, the conductive layers 17 and the like.

On the interlayer insulating film 18, the pixel electrodes 11 are provided. The pixel electrodes 11 are each connected, via a contact hole 18a formed in the interlayer insulating film 18, to the conductive layer 17 acting as the drain electrode of the second TFT 12b. On the pixel electrodes 11 (i.e., the outermost surface of the TFT substrate 100a on the liquid crystal layer 30 side), an alignment film (not shown) is provided.

The counter substrate (color filter substrate) 100b facing the TFT substrate 100a includes the insulating substrate 20 and the counter electrode 21 located on the liquid crystal layer 30 side of the insulating substrate 20. The counter substrate 100b also includes red color filters 22R, green color filters 22G and blue color filters 22B respectively provided in correspondence with the red pixels 1R, the green pixels 1G and the blue pixels 1B, and a black matrix (light blocking layer) BM located between these color filters. On the counter electrode 21 (i.e., the outermost surface of the counter substrate 100b on the liquid crystal layer 30 side), an alignment film (not shown) is provided.

In the example shown in FIG. 26, the temporary storage capacitor $C_T$ is formed of the first electrode E1 provided in the TFT substrate 100a, the second electrode E2 provided in the counter substrate 100b, and the dielectric layer Di located between the first electrode E1 and the second electrode E2.

The first electrode E1 is formed of the same conductive film as that of the pixel electrodes 11 (i.e., by use of the same conductive material and in the same production step). The first electrode E1 is connected, via a contact hole 18b formed in the interlayer insulating layer 18, to the conductive layer 17 acting as the drain electrode and the source electrode of the first TFT 12a.

The second electrode E2 is formed of the same conductive film as that of the counter electrodes 21 (i.e., by use of the same conductive material and in the same production step). Typically, the counter electrode 21 is a single conductive layer common to the plurality of pixels 1 and continuous over the entirety of the display area. Thus, it can be considered that a part of the counter electrode 21 (part facing the first electrode E1) acts as the second electrode E2.

The dielectric layer Di is different from the liquid crystal layer 30, and is formed to have the same thickness as that of the liquid crystal layer 30. The dielectric layer Di may be formed of, for example, silicon nitride ($SiN_x$) or silicon oxide ($SiO_2$). Alternatively, the dielectric layer Di may be formed of an organic dielectric material.

In the example shown in FIG. 26, the black matrix BM is provided also in an area overlapping the temporary storage capacitor $C_T$ in order to prevent a situation where light transmitted through the temporary storage capacitor $C_T$ declines the display quality (light leaks).

In the case where the display signal voltage is once supplied to, and accumulated in, the temporary storage capacitor $C_T$ and then the voltage is written to the pixel capacitor $C_{Pix}$ as in the liquid crystal display devices 100 and 100A through 100D in Embodiments 1 through 5, a voltage drop may occur. Specifically, where the display signal voltage supplied to the temporary storage capacitor $C_T$ is $V_0$ and the capacitance values of the temporary storage capacitor $C_T$ and the pixel capacitor $C_{Pix}$ are respectively $C_T'$ and $C_{Pix}'$, the voltage $V_{LC}$ written to the pixel capacitor $C_{Pix}$ (voltage supplied to the pixel electrode 11) is represented by the following expression (3).

$$V_{LC} = \{C_T'/(C_{Pix}'+C_T')\} \cdot V_0 \tag{3}$$

In the case where the storage capacitor $C_{CS}$ is not provided, the pixel capacitor $C_{Pix}$ is formed only of the liquid crystal capacitor $C_{LC}$. Therefore, where the capacitance value of the liquid crystal capacitor $C_{LC}$ is $C_{LC}'$, expression (4) is obtained from expression (3).

$$V_{LC} = \{C_T'/(C_{LC}'+C_T')\} \cdot V_0 \tag{4}$$

The voltage drop occurring at the time of voltage write to the pixel capacitor $C_{Pix}$ is represented by expression (4). In order to decrease the voltage drop, it is preferable to make the capacitance value $C_T'$ of the temporary storage capacitor $C_T$ as large as possible. For example, in the structure shown in FIG. 26, the thickness of the dielectric layer Di is the same as the thickness of the liquid crystal layer 30. Assuming that the area size of the first electric E1 is the same as the area size of the pixel electrode 11 and that the dielectric constant of the dielectric layer Di is three times as large as the dielectric constant of the liquid crystal layer 30, the capacitance value $C_T'$ of the temporary storage capacitor $C_T$ is three times as large as the capacitance value $C_{LC}'$ of the liquid crystal capacitor $C_{LC}$. Therefore, the written voltage $V_{LC}$ is represented by the following expression (5). Thus, in this case, a voltage drop of 25% occurs.

$$\begin{aligned} V_{LC} &= \{C_T'/(C_{LC}' + C_T')\} \cdot V_0 \\ &= \{3C_{LC}'/(C_{LC}' + 3C_{LC}')\} \cdot V_0 \\ &= (3/4) \cdot V_0 \end{aligned} \tag{5}$$

Figure 27:
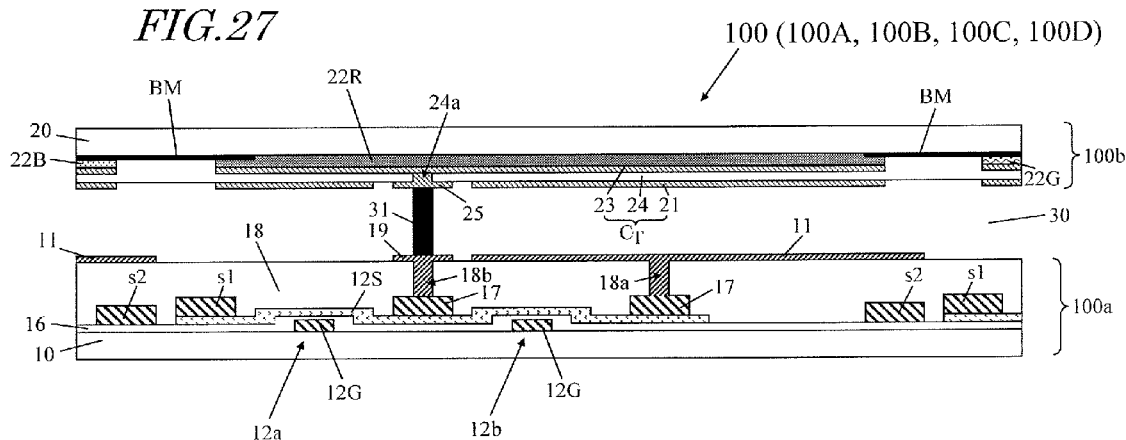
FIG. 27 shows another example of cross-sectional structure of the liquid crystal display device 100 (or any of the liquid crystal display devices 100A through 100D).
Figure 28:
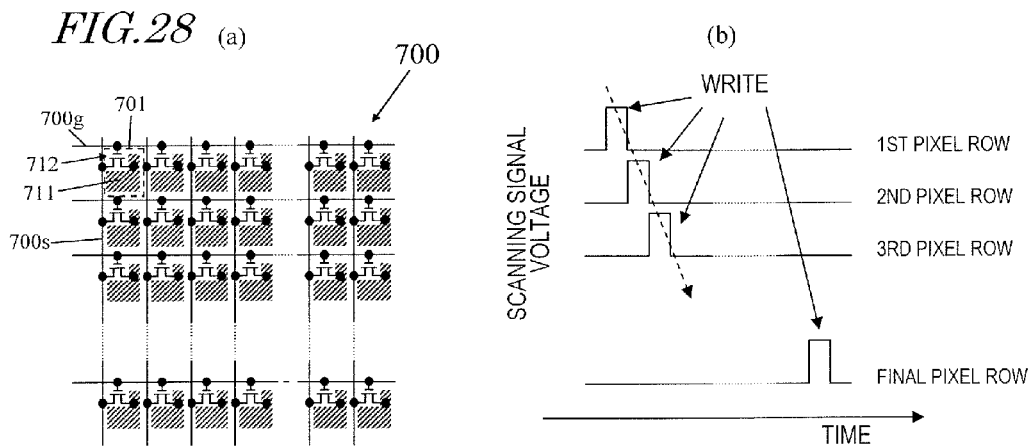
FIG. 28(a) is an equivalent circuit diagram of the conventionally common active matrix liquid crystal display device 700.
FIG. 28(b) shows waveforms of a scanning signal voltage supplied from scanning lines 700g of the liquid crystal display device 700.
Figure 29:
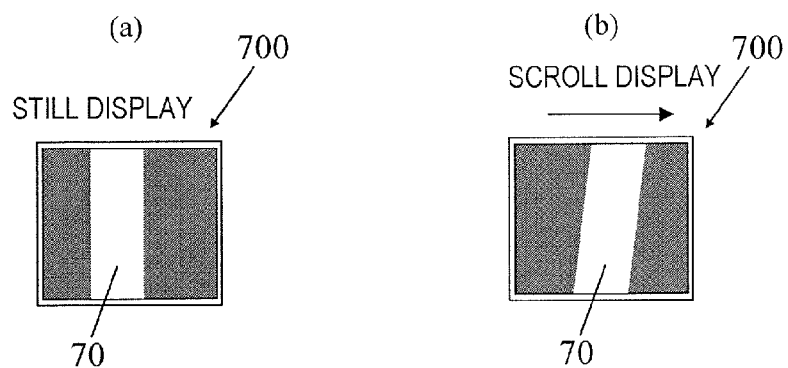
FIG. 29(a) shows the vertical bar 70 displayed in a still manner on a screen of the liquid crystal display device 700.
FIG. 29(b) shows the vertical bar 70 displayed in a scroll manner so as to move rightward on the screen of the liquid crystal display device 700.
Figure 30:
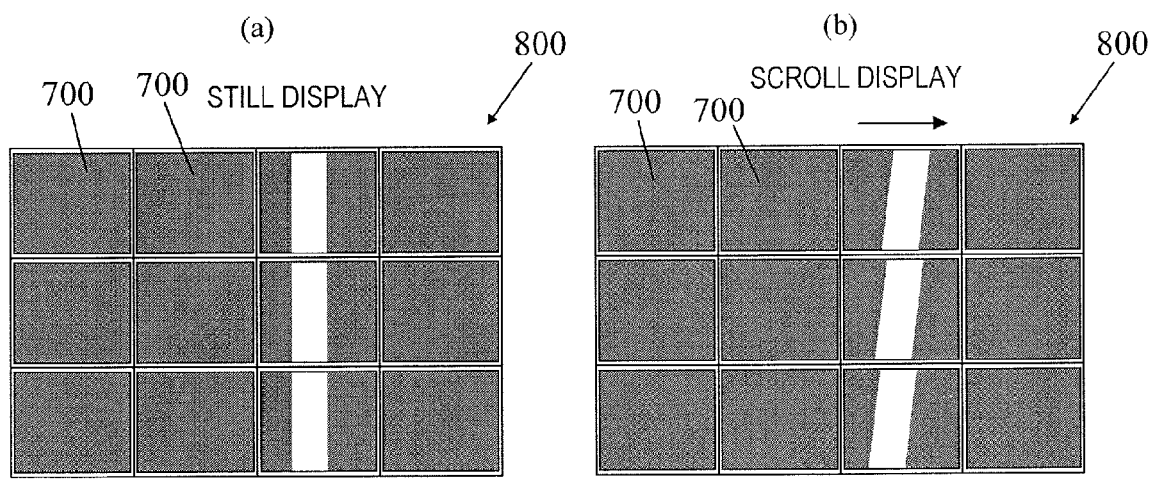
FIG. 30(a) shows the vertical bar 70 displayed in a still manner on a screen of a multi-display system 800.
FIG. 30(b) shows the vertical bar 70 displayed in a scroll manner so as to move rightward on the screen of the multi-display system 800.
Figure 31:
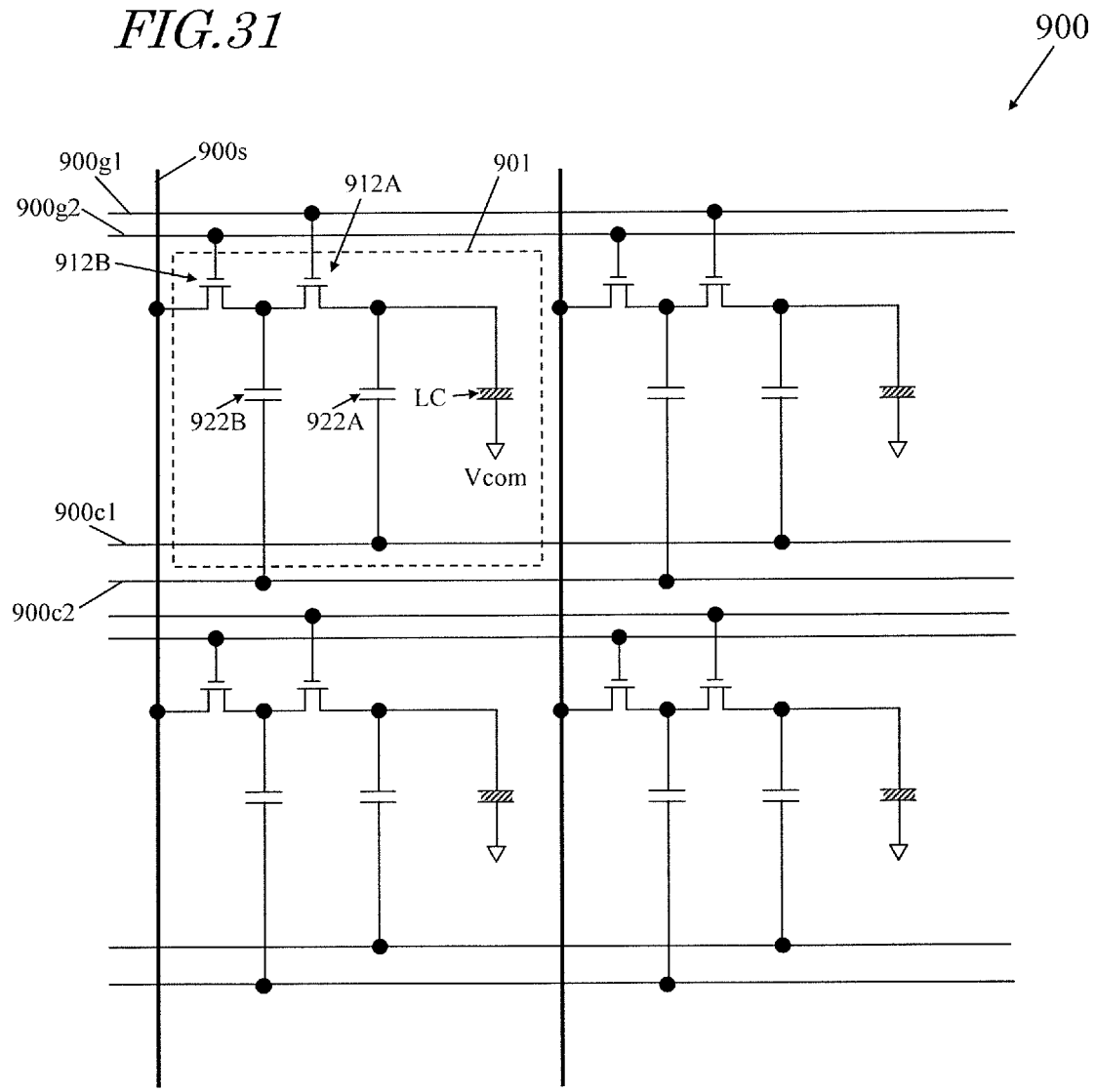
FIG. 31 is an equivalent circuit diagram of a liquid crystal display device 900 disclosed in Patent Document 1.

FIG. 27 shows another specific example of structure of the temporary storage capacitor $C_T$. In the example shown in FIG. 27, the temporary storage capacitor $C_T$ is formed of the counter electrode 21, another electrode 23 provided in the counter substrate 100b and another dielectric layer 24 provided between the counter electrode 21 and the another electrode 23.

The another electrode 23 is provided so as to overlap the counter electrode 21, and is formed of a transparent conductive material (e.g., ITO). The another electrode 23 corresponds to the first electrode E1 in FIG. 3, and the counter electrode 21 corresponds to the second electrode E2 in FIG. 3.

The dielectric layer 24 has a thickness of, for example, about several micrometers. The dielectric layer 24 may be formed of any of various known transparent dielectric materials. The dielectric layer 24 corresponds to the dielectric layer Di in FIG. 3.

The another electrode 23 is electrically connected to the conductive layer 17 of the TFT substrate 100a (acting as the drain electrode of the first TFT 12a and the source electrode of the second TFT 12b) in the TFT substrate 100a via a first connection electrode 19 provided in the TFT substrate 100a, a second connection electrode 25 provided in the counter substrate 100b and a conductive part 31 provided between the first connection electrode 19 and the second connection electrode 25. The first connection electrode 19 is formed of the same conductive film as that of the pixel electrodes 11, and is connected to the conductive layer 17 via the contact hole 18b formed in the interlayer insulating film 18. The second connection electrode 25 is formed of the same conductive film as that of the counter electrodes 21, and is connected to the another electrode 23 via a contact hole 24 formed in the dielectric layer 24. The conductive part 31 electrically connects the first connection electrode 19 and the second connection electrode 25 to each other. The conductive part 31 may be formed of any of various known conductive materials.

As described above, in order to decrease the voltage drop occurring at the time of voltage write to the pixel capacitor $C_{Pix}$, it is preferable to make the capacitance value $C_T'$ of the temporary storage capacitor $C_T$ as large as possible. The capacitance value $C_T'$ of the temporary storage capacitor $C_T$ is represented by the following expression (6) by use of the dielectric constant $\in$ of the dielectric layer 24, the thickness d of the dielectric layer 24 and the area size S of the another electrode 23 (more strictly, the area size of a part of the another electrode 23 that overlaps the counter electrode 21).

$$C_T' = (\in \cdot S)/d \quad (6)$$

As can be seen from expression (6), as the area size S of the another electrode 23 is larger, or as the thickness d of the dielectric layer 24 is smaller, the capacitance value $C_T'$ is larger. In the structure shown in FIG. 26, as the area size of the first electrode E1 is increased, the aperture ratio is decreased. In addition, the thickness of the dielectric layer Di cannot be smaller than the thickness of the liquid crystal layer 30. By contrast, in the structure shown in FIG. 27, even when the area size S of the another electrode 23 is increased, the aperture ratio is not decreased. In addition, the thickness d of the dielectric layer 24 can be made sufficiently small. Therefore, when the structure shown in FIG. 27 is adopted, the capacitance value $C_T'$ of the temporary storage capacitor $C_T$ can be made larger easily, specifically, at least several times larger, than when the structure shown in FIG. 26 is adopted.

Assuming that, for example, the capacitance value $C_T'$ can be made ten times larger than the capacitance value $C_T'$ calculated provisionally by use of expression (5) (i.e., 30 times larger than the capacitance value $C_{LC}'$ of the liquid crystal capacitor $C_{LC}$), the written voltage $V_{LC}$ is represented by the following expression (7). In this case, the voltage drop is about 3%, namely, it is considered that there is almost no voltage drop.

$$V_{LC} = \{C_T'/(C_{LC}' + C_T')\} \cdot V_0 \quad (7)$$
$$= \{30 C_{LC}'/(30 C_{LC}' + 3 C_{LC}')\} \cdot V_0 \ldots$$
$$= (30/31) \cdot V_0$$

As described above, the liquid crystal display devices 100 and 100A through 100D in preferable embodiments according to the present invention can write a desired voltage to all the pixels globally with a simple structure. Therefore, the liquid crystal display devices 100 and 100A through 100D are preferably used for a multi-display system. There is no specific limitation on the number of the liquid crystal display devices included in a multi-display system. With the liquid crystal display devices 100 and 100A through 100D, display continuity can be kept between liquid crystal display devices adjacent to each other in the column direction (see FIG. 6(b)). Therefore, the liquid crystal display devices 100 and 100A through 100D are considered to be preferably usable especially in a multi-display system including at least two liquid crystal display devices located so as to be adjacent to each other in the column direction (namely, including liquid crystal display devices located in two or more rows). For combining a plurality of liquid crystal display devices to provide a multi-display system, any of various known methods is usable.

INDUSTRIAL APPLICABILITY

An embodiment of the present invention provides a liquid crystal display device which can write a desired voltage to all the pixels globally with a simple structure. A liquid crystal display device in an embodiment of the present invention is preferably usable in a multi-display system. A multi-display system including liquid crystal display devices in an embodiment of the present invention is preferably usable as a large-screen display device such as an information display, a digital signage display or the like.

REFERENCE SIGNS LIST

1 Pixel
1R Red pixel
1G Green pixel
1B Blue pixel
12a First TFT (first switching element)
12b Second TFT (second switching element)
12c Third TFT (third switching element)
21 Counter electrode
23 Another electrode
24 Dielectric layer
30 Liquid crystal layer
60, 60A, 60B Signal line driving circuit (source driver)
62 Scanning line driving circuit (gate driver)
g1 First scanning line
g2 Second scanning line
g3 Third scanning line
s1 First signal line
s2 Second signal line
c1 Storage capacitor line
$C_T$ Temporary storage capacitor
$C_{Pix}$ Pixel capacitor
$C_{LC}$ Liquid crystal capacitor
$C_{CS}$ Storage capacitor E1 First electrode
E2 Second electrode
Di Dielectric layer
100a Active matrix substrate (TFT substrate)
100b Counter substrate (color filter)
100, 100A, 100B, 100C, 100D Liquid crystal display device
200 Multi-display system

The invention claimed is:

1. A liquid crystal display device, comprising:
a plurality of pixels arrayed in a matrix including a plurality of pixel rows and a plurality of pixel columns;
a pixel electrode provided for each of the plurality of pixels;
a counter electrode facing the pixel electrodes;
a liquid crystal layer provided between the pixel electrodes and the counter electrode;
a first scanning line, a second scanning line and a third scanning line which are provided for each of the plurality of pixel rows;
a first signal line and a second signal line which are provided for each of the plurality of pixel columns;
a pixel capacitor including a liquid crystal capacitor and provided for each of the plurality of pixels;
a temporary storage capacitor provided for each of the plurality of pixels, the temporary storage capacitor temporarily storing a voltage to be written to the pixel capacitor;
first switching elements each of which is to be turned ON/OFF by a scanning signal voltage supplied from the first scanning line and controls electrical connection between the first signal line and the temporary storage capacitor;
second switching elements each of which is to be turned ON/OFF by a scanning signal voltage supplied from the second scanning line and controls electrical connection between the temporary storage capacitor and the pixel capacitor; and
third switching elements each of which is to be turned ON/OFF by a scanning signal voltage supplied from the third scanning line and controls electrical connection between the second signal line and the pixel capacitor,
wherein a capacitance value of the temporary storage capacitor is not less than three times a capacitance value of the liquid crystal capacitor.

2. The liquid crystal display device of claim 1, wherein:
an optional vertical scanning period includes a first period, a second period subsequent to the first period, and a third period subsequent to the second period;
in the first period, the first switching elements are turned ON on a pixel row-by-pixel row basis, so that a display signal voltage is supplied from the first signal lines to the temporary storage capacitors;
in the second period after the display signal voltage is supplied to the temporary storage capacitors in all of the plurality of pixels, the third switching elements in all the plurality of pixels are turned ON, so that a reset voltage is supplied from the second signal lines to the pixel capacitors; and
in the third period after a voltage written to the pixel capacitors in an immediately previous vertical scanning period is reset by the reset voltage, the second switching elements in all the plurality of pixels are turned ON, so that the voltage stored in the temporary storage capacitors is written to the pixel capacitors in all the plurality of pixels globally.

3. The liquid crystal display device of claim 2, wherein the reset voltage supplied from the second signal lines to the pixel capacitors in the second period has substantially the same level as that of a voltage supplied to the counter electrode.

4. The liquid crystal display device of claim 2, wherein:
in a first half of the first period, a display signal voltage of a first polarity is supplied from the first signal lines to the temporary storage capacitors in the pixels in a half of the plurality of pixel rows, which include the plurality of pixels; and
in a second half of the first period, a display signal voltage of a second polarity opposite to the first polarity is supplied from the first signal lines to the temporary storage capacitors in the pixels in another half of the plurality of pixels.

5. The liquid crystal display device of claim 4, wherein in each of the first half and the second half of the first period, the display signal voltage is supplied from the first signal lines to the temporary storage capacitors in every other pixel row.

6. The liquid crystal display device of claim 2, further comprising a signal line driving circuit that supplies a voltage to the first signal line and the second signal line;
wherein in the first period, the voltage supplied from the signal line driving circuit to the first signal line, and the voltage supplied from the signal line driving circuit to the second signal line, have substantially the same level as each other in opposite polarities from each other with respect to a voltage supplied to the counter electrode.

7. The liquid crystal display device of claim 1, wherein the first signal lines and the second signal lines are each divided into a first part located in a relatively upper area in a column direction and a second part located in a relatively lower area in the column direction.

8. A liquid crystal display device, comprising:
a plurality of pixels arrayed in a matrix including a plurality of pixel rows and a plurality of pixel columns;
a pixel electrode provided for each of the plurality of pixels;
a counter electrode facing the pixel electrodes;
a liquid crystal layer provided between the pixel electrodes and the counter electrode;
a first scanning line, a second scanning line and a third scanning line which are provided for each of the plurality of pixel rows;
a first signal line and a second signal line which are provided for each of the plurality of pixel columns;
a pixel capacitor including a liquid crystal capacitor and provided for each of the plurality of pixels;
a temporary storage capacitor provided for each of the plurality of pixels, the temporary storage capacitor temporarily storing a voltage to be written to the pixel capacitor;
first switching elements each of which is to be turned ON/OFF by a scanning signal voltage supplied from the first scanning line;
second switching elements each of which is to be turned ON/OFF by a scanning signal voltage supplied from the second scanning line and controls electrical connection between the temporary storage capacitor and the pixel capacitor; and
third switching elements each of which is to be turned ON/OFF by a scanning signal voltage supplied from the third scanning line;
wherein:
in each of the pixels in a part of the plurality of pixel rows, which include the plurality of pixels, the first switching element controls electrical connection between the first signal line and the temporary storage capacitor, and the third switching element controls electrical connection between the second signal line and the pixel capacitor;

in each of the pixels in the rest of the plurality of pixel rows, the first switching element controls electrical connection between the second signal line and the temporary storage capacitor, and the third switching element controls electrical connection between the first signal line and the pixel capacitor; and a capacitance value of the temporary storage capacitor is not less than three times a capacitance value of the liquid crystal capacitor.

9. The liquid crystal display device of claim 8, wherein:

an optional vertical scanning period includes a first period, a second period subsequent to the first period, and a third period subsequent to the second period;

in the first period, in the part of the plurality of pixel rows, the first switching elements are turned ON on a pixel row-by-pixel row basis, so that a display signal voltage is supplied from the first signal lines to the temporary storage capacitors;

in the first period, in the rest of the plurality of pixel rows, the first switching elements are turned ON on a pixel row-by-pixel row basis, so that a display signal voltage is supplied from the second signal lines to the temporary storage capacitors;

in the second period after the display signal voltage is supplied to the temporary storage capacitors in all of the plurality of pixels, the third switching elements in all the plurality of pixels are turned ON, so that a reset voltage is supplied from the first signal lines or the second signal lines to the pixel capacitors; and in the third period after a voltage written to the pixel capacitors in an immediately previous vertical scanning period is reset by the reset voltage, the second switching elements in all the plurality of pixels are turned ON, so that the voltage stored in the temporary storage capacitors is written to the pixel capacitors in all the plurality of pixels globally.

10. The liquid crystal display device of claim 9, wherein the reset voltage supplied from the first signal lines or the second signal lines to the pixel capacitors in the second period has substantially the same level as that of a voltage supplied to the counter electrode.

11. The liquid crystal display device of claim 8, wherein:

the part of the plurality of pixel rows is a half of the plurality of pixel rows; and the rest of the plurality of pixel rows is another half of the plurality of pixel rows.

12. The liquid crystal display device of claim 1, comprising:

an active matrix substrate including the pixel electrodes, the first scanning lines, the second scanning lines, the third scanning lines, the first signal lines, the second signal lines, the first switching elements, the second switching elements, and the third switching elements; and a counter substrate including the counter electrode and facing the active matrix substrate;

wherein the temporary storage capacitors are each formed of a first electrode provided in the active matrix substrate and formed of a conductive film which is the same as that of the pixel electrodes, a second electrode provided in the counter substrate and formed of a conductive film which is the same as that of the counter electrode, and a dielectric layer which is provided between the first electrode and the second electrode and is different from the liquid crystal layer.

13. The liquid crystal display device of claim 1, comprising:

an active matrix substrate including the pixel electrodes, the first scanning lines, the second scanning lines, the third scanning lines, the first signal lines, the second signal lines, the first switching elements, the second switching elements, and the third switching elements; and a counter substrate including the counter electrode and facing the active matrix substrate;

wherein the temporary storage capacitors are each formed of the counter electrode, another electrode provided in the counter substrate and overlapping the counter electrode, and a dielectric layer provided between the counter electrode and the another electrode.

14. A multi-display system, comprising:

a plurality of liquid crystal display devices each of which is of claim 1;

wherein the plurality of liquid crystal display devices include two liquid crystal display devices located so as to be adjacent to each other in a column direction.

15. The liquid crystal display device of claim 1, wherein the capacitance value of the temporary storage capacitor is not less than thirty times the capacitance value of the liquid crystal capacitor.

16. The liquid crystal display device of claim 8, wherein the capacitance value of the temporary storage capacitor is not less than thirty times the capacitance value of the liquid crystal capacitor.

* * * * *